US007351965B2

(12) United States Patent
Wells

(10) Patent No.: US 7,351,965 B2
(45) Date of Patent: Apr. 1, 2008

(54) ROTATING EXCITATION FIELD IN LINEAR ION PROCESSING APPARATUS

(75) Inventor: Gregory J. Wells, Fairfield, CA (US)

(73) Assignee: Varian, Inc., Palo Alto, CA (US)

( * ) Notice: Subject to any disclaimer, the term of this patent is extended or adjusted under 35 U.S.C. 154(b) by 259 days.

(21) Appl. No.: 11/342,956

(22) Filed: Jan. 30, 2006

(65) Prior Publication Data

US 2007/0176098 A1 Aug. 2, 2007

(51) Int. Cl.
*B01D 59/44* (2006.01)

(52) U.S. Cl. ...................... 250/292; 250/290; 250/281; 250/282

(58) Field of Classification Search ................ 250/290, 250/292, 281, 282
See application file for complete search history.

(56) References Cited

U.S. PATENT DOCUMENTS 4,749,860 A 6/1988 Kelley et al.
4,761,545 A 8/1988 Marshall et al.
4,882,484 A 11/1989 Franzen et al.
5,134,286 A 7/1992 Kelley
5,179,278 A 1/1993 Douglas
5,198,665 A 3/1993 Wells
5,300,772 A 4/1994 Buttrill, Jr.
5,324,939 A 6/1994 Louris et al.
5,345,078 A 9/1994 Kelley
5,420,425 A 5/1995 Bier et al.
5,468,958 A 11/1995 Franzen et al.
5,886,346 A 3/1999 Makarov
6,087,658 A 7/2000 Kawato
6,723,986 B2 4/2004 Kernan et al.
6,797,950 B2 9/2004 Schwartz et al.
2002/0185596 A1* 12/2002 Amy et al. ................. 250/292
2005/0263696 A1 12/2005 Well
2007/0023646 A1* 2/2007 Li et al. ..................... 250/292

OTHER PUBLICATIONS

Article by Schwartz, et al., entitled "A Two-Dimensional Quadrupole Ion Trap Mass Spectrometer", published by J Am Soc Mass Spectrom 2002, 13, pp. 659-669.
Book by Franzen, et al., entitled "Practical Aspects of Ion Trap Mass Spectrometry", published by Mar, R.E.; Todd, JFJ; Editors; CRC Press (1995), pp. 67-69 and 108.
Article by Raznikov, et al., entitled "Ion Rotating Motion in a Gas-Filled Radio-Frequency Quadrupole Ion Guide as a New Technique for Structural and Kinetic Investigations of Ions", published Rapid Commun. Mass Spectrom, vol. 15, pp. 1912-1921 (2001).
Article by March, R.E. entitled An Introduction to Quadrupole Ion Trap Mass Spectrometry, J. Mass Spectrometry, vol. 32, pp. 351-369 (1997).

* cited by examiner

*Primary Examiner*—Robert Kim
*Assistant Examiner*—Michael Maskell
(74) *Attorney, Agent, or Firm*—Bella Fishman; David Gloekler

(57) ABSTRACT

Methods for applying an RF field in a two-dimensional electrode structure include applying RF voltages to main electrodes and to compensation electrodes. The voltages on the compensation electrodes may be adjusted to be proportional to the voltages on the main electrodes. The adjustment (s) may be done to optimize the RF field for different modes of operation such as ion ejection and ion dissociation. For dissociation, a supplemental RF dipole may be applied, or two mutually orthogonal dipoles may be applied in phase quadrature to form a circularly polarized field. Electrode structures may include main trapping electrodes, one or more compensation electrodes, one or more ion exit apertures, and means for applying the various desired voltages.

20 Claims, 36 Drawing Sheets

ROTATING EXCITATION FIELD IN LINEAR ION PROCESSING APPARATUS

CROSS-REFERENCE TO RELATED APPLICATIONS

This application is related to the following co-pending U.S. patent applications, which are commonly assigned to the assignee of the present disclosure: "Two-Dimensional Electrode Constructions for Ion Processing," "Compensating for Field Imperfections in Linear Ion Processing Apparatus," "Adjusting Field Conditions in Linear Ion Processing Apparatus for Different Modes of Operation," and "Improved Field Conditions for Ion Excitation in Linear Processing Apparatus." each of which is being filed concurrently with the present application on Jan. 30, 2006.

FIELD OF THE INVENTION

The present invention relates generally to the manipulation or processing of ions in electrode arrangements of two-dimensional or linear geometry. More specifically, the invention relates to methods and apparatus for generating rotating excitation fields for enhancing processes related to ion excitation such as collision-induced dissociation (CID). The methods and apparatus may be implemented, for example, in conjunction with mass spectrometry-related operations including tandem and multi-stage mass spectrometry (MS/MS and $MS^n$).

BACKGROUND OF THE INVENTION

A linear or two-dimensional ion-processing device such as an ion trap is formed by a set of electrodes coaxially arranged about a central (z) axis of the device and elongated in the direction of the central axis. Typically, each electrode is positioned in the (x-y) plane orthogonal to the central axis at a radial distance from the central axis. The inside surfaces of the electrodes are typically hyperbolic with apices facing inwardly toward the central axis. The resulting arrangement of electrodes defines an axially elongated interior space of the device between opposing inside surfaces. In operation, ions may be introduced, trapped, stored, isolated, and subjected to various reactions in the interior space, and may be ejected from the interior space for detection. The radial excursions of ions along the x-y plane may be controlled by applying a two-dimensional RF trapping field between opposing pairs of electrodes. The axial excursions of ions, or the motion of ions along the central axis, may be controlled by applying an axial DC trapping field between the axial ends of the electrodes. Additionally, auxiliary or supplemental RF fields may be applied between an opposing pair of electrodes to increase the amplitudes of oscillation of ions of selected mass-to-charge ratios along the axis of the electrode pair and thereby increase the kinetic energies of the ions for various purposes, including ion ejection and collision-induced dissociation (CID).

Ions present in the interior space of the electrode set are responsive to, and their motions influenced by, all electric fields active within the interior space. These fields include fields applied intentionally by electrical means as in the case of the above-noted DC and RF fields, and fields inherently (mechanically) generated due to the physical/geometric features of the electrode set. The inherently generated fields may or may not be intentional and, depending on the mode of operation, may or may not be desirable or optimal. Both applied fields and inherently generated fields are governed by the configuration (profile, geometry, features, and the like) of the inside surfaces of the electrodes exposed to the interior space. Points on the inside surfaces closest to the central axis, such as the apical line of a hyperbolic electrode, have the greatest influence on an RF trapping field and thus on the ions constrained by the RF trapping field to the volume around the central axis.

In an ideal case, the physical features and geometry of the electrodes would be perfect such that no imperfections in the active fields existed to impair the desired mode of operation of the ion processing device. The electrodes would be perfect hyperbolic surfaces extending to infinity toward the asymptotes. The response of ions to the fields would be completely predictable and controllable, and the performance of the device as a mass analyzer or the like could be completely optimized. In an ideal (pure) quadrupolar RF trapping field, no higher-order multipole fields would be present and the secular frequency of oscillation of an ion in a given coordinate direction would be independent of the secular frequency of oscillation in an orthogonal direction and independent of the amplitude of the oscillation. Moreover, the strength of the ideal field would increase linearly with distance from the central axis along either the x-axis or the y-axis.

In practice, however, the electrodes include a number of different features that engender various types of symmetrical and/or asymmetrical field faults or distortions affecting the manipulation and behavior of ions. For example, most linear electrode systems employed as ion traps eject ions from the interior space in a radial (x or y) direction orthogonal to the central axis, typically through a slot formed at the apex of at least one of the electrodes. The slot is a significant source of field faults that may be considered detrimental to the ion ejection or mass scanning process. For instance, a single slot formed in one of the electrodes generates odd-ordered multipole fields such as hexapolar fields, and two slots respectively formed in two opposing electrodes generate even-ordered fields such as octopole fields. Another source of field faults stems from the necessity that electrodes have truncated (finite) shapes that may likewise generate higher-order multipole field components. Multipoles in the trapping field may produce a variety of nonlinear resonances. In a real quadrupolar RF field employed for trapping ions, such imperfections may adversely affect the ion ejection process by causing shifts in the ion ejection time that are dependent on the chemical structure of the ions. The shift in ejection time results in mass shifts in the mass spectrum that are dependent on the chemical structure of an ion and not its mass. Therefore, it would be highly advantageous to eliminate such adverse effects when using the ion trap as a mass spectrometer.

Conventional approaches for ameliorating the undesired effects of field imperfections include increasing or "stretching" the separation of two opposing electrodes and shaping the electrodes in ways that deviate from theoretically ideal parameters. It is has been observed by the present inventor, however, that while these approaches may adequately compensate for multipole components due to the truncation of the electrodes to a finite size, they do not filly compensate for multipole components caused by large holes and slots in the electrodes. Another approach is to provide shim electrodes positioned inside of the apertures of the electrodes. See U.S. Patent App. Pub. No. US 2002/0185596 A1. This technique, however, does not address and fails to appreciate the need for, and benefits obtained from, compensating for the reduction in the field strength where the ions are oscillating, such as directly on the axis of symmetry of the slot and in the interior space of an ion processing device. Moreover, conventional approaches fail to adequately address the need for controlling field imperfections so as to optimize different modes of operation.

Conversely, the elimination of the effects of imperfections such as nonlinear resonances may be considered disadvantageous when performing other types of ion-processing operations such as collision-induced dissociation (CID). That is, the proper utilization of field defects may be advantageous during processes such as CID. Therefore, it would also be advantageous to be able to utilize field faults to optimize processes entailing ion excitation, and particularly CID. It would also be advantageous to improve the duty cycle and efficiency of CID and provide a greater amount of energy available for dissociation.

SUMMARY OF THE INVENTION

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a method is provided for forming a circularly polarized RF field in an electrode structure. Such an electrode structure includes a plurality of main electrodes coaxially disposed about a central axis and extending generally in the direction of the central axis. The main electrodes define an interior space extending along the central axis. A first RF voltage is applied to at least two of the main electrodes. A second RF voltage is applied to a compensation electrode. The compensation electrode is disposed in the interior space proximate to a corresponding main electrode, at a radial distance from the central axis less than the radial distance of the corresponding main electrode from the central axis. A third RF voltage is applied between first and second main electrodes that are spaced apart along a first axis orthogonal to the central axis. A fourth RF voltage is applied, in phase quadrature with the third RF voltage, between third and fourth main electrodes that are spaced apart along a second axis orthogonal to the central axis.

According to another implementation, the first RF voltage is applied at a first amplitude, and the second RF voltage is applied at a second amplitude different from the first amplitude.

According to another implementation, the first RF voltage is applied at a first amplitude, and the second RF voltage is applied at a second amplitude that is substantially equal to the first amplitude.

According to another implementation, an ion is ejected from the interior space, and another ion may be subjected to collision-induced dissociation or another type of ion excitation or activation process. The third and fourth RF voltages may be applied to cause the collision-induced dissociation or other type of ion excitation or activation process.

According to another implementation, the electrode structure includes a plurality of compensation electrodes, and the second RF voltage is applied to at least two of the compensation electrodes.

According to another implementation, the at least two main electrodes are first and second main electrodes, and the plurality of main electrodes further includes a third main electrode and a fourth main electrode. The electrode structure further comprises a first compensation electrode, a second compensation electrode, a third compensation electrode and a fourth compensation electrode. The first RF voltage is applied to the third and fourth main electrodes at a polarity opposite to the polarity applied to the first and second main electrodes. The second RF voltage is applied to the first and second compensation electrodes, and to the third and fourth compensation electrodes at a polarity opposite to the polarity applied to the first and second compensation electrodes.

According to another implementation, an electrode structure for manipulating ions is provided. The electrode structure comprises a plurality of main electrodes and a compensation electrode. The main electrodes are coaxially disposed about a central axis and extend generally in the direction of the central axis. The main electrodes define an interior space extending along the central axis. The compensation electrode is disposed in the interior space proximate to a corresponding main electrode, at a radial distance from the central axis less than the radial distance of the corresponding main electrode from the central axis. The electrode structure further comprises means for applying a first RF voltage to at least two of the main electrodes, means for applying a second RF voltage to the compensation electrode, and means for forming a circularly polarized RF field in the interior space.

According to another implementation, the plurality of main electrodes includes a first main electrode, a second main electrode spaced from the first main electrodes along a first axis orthogonal to the central axis, a third main electrode, and a fourth main electrode spaced from the third main electrode along a second axis orthogonal to the central axis. The means for forming the circularly polarized RF field includes means for applying a third RF voltage between the first and second main electrodes, and means for applying a fourth RF voltage between third and fourth main electrodes in phase quadrature with the third RF voltage.

According to another implementation, the means for applying the second RF voltage includes means for adjusting the second RF voltage between a first amplitude optimal for a first mode of operation and a second amplitude optimal for a second mode of operation.

According to other implementations, the electrode structure may have one or more compensation electrodes. One or more of the main electrodes may have apertures. The number of compensation electrodes may be less than or equal to the number of apertures. The RF voltages applied to the one or more main electrodes may also be applied to the one or more compensation electrodes at an amplitude that are the same or different than the amplitude of the voltage on the one or more main electrodes. These voltages may be employed to generate an ion trapping field in the interior space of the electrode structure. One or more additional RF voltages may be applied to the one or more main electrodes as well as the one or more compensation electrodes. These additional RF voltages may be employed to generate one or more resonant dipoles for purposes related to ion excitation such as collision-induced dissociation, and ion ejection through one or more of the apertures.

DETAILED DESCRIPTION OF THE INVENTION

In general, the term "communicate" (for example, a first component "communicates with" or "is in communication with" a second component) is used herein to indicate a structural, functional, mechanical, electrical, optical, magnetic, ionic or fluidic relationship between two or more components (or elements, features, or the like). As such, the fact that one component is said to communicate with a second component is not intended to exclude the possibility that additional components may be present between, and/or operatively associated or engaged with, the first and second components.

The subject matter provided in the present disclosure generally relates to electrodes and arrangements of electrodes of the type provided in apparatus employed for manipulating, processing, or controlling ions. The electrode arrangements may be utilized to implement a variety of functions. As non-limiting examples, the electrode arrangements may be utilized as chambers for ionizing neutral molecules; lenses or ion guides for focusing, gating and/or transporting ions; devices for cooling or thermalizing ions; devices for trapping, storing and/or ejecting ions; devices for isolating desired ions from undesired ions; mass analyzers or sorters; mass filters; stages for performing tandem or multiple mass spectrometry (MS/MS or $MS^n$); collision cells for fragmenting or dissociating precursor ions; stages for processing ions on either a continuous-beam, sequential-analyzer, pulsed or time-sequenced basis; ion cyclotron cells; and devices for separating ions of different polarities. However, the various applications of the electrodes and electrode arrangements described in the present disclosure are not limited to these types of procedures, apparatus, and systems. Examples of electrodes and electrode arrangements and related implementations in apparatus and methods are described in more detail below with reference to FIGS. 1-36.

Figure 1:
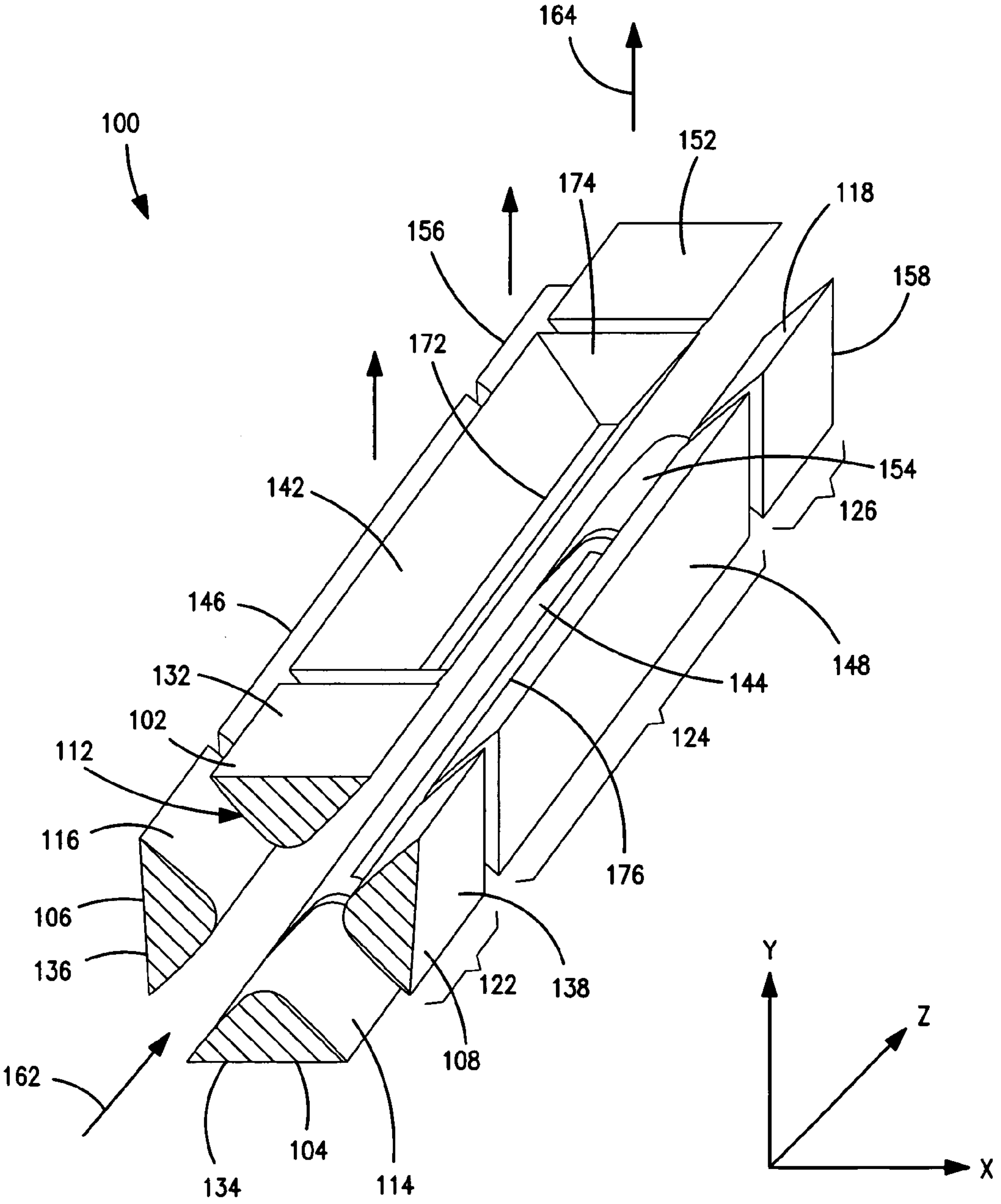
FIG. 1 is a perspective view of an example of an electrode structure provided according to implementations described in the present disclosure.
Figure 2:
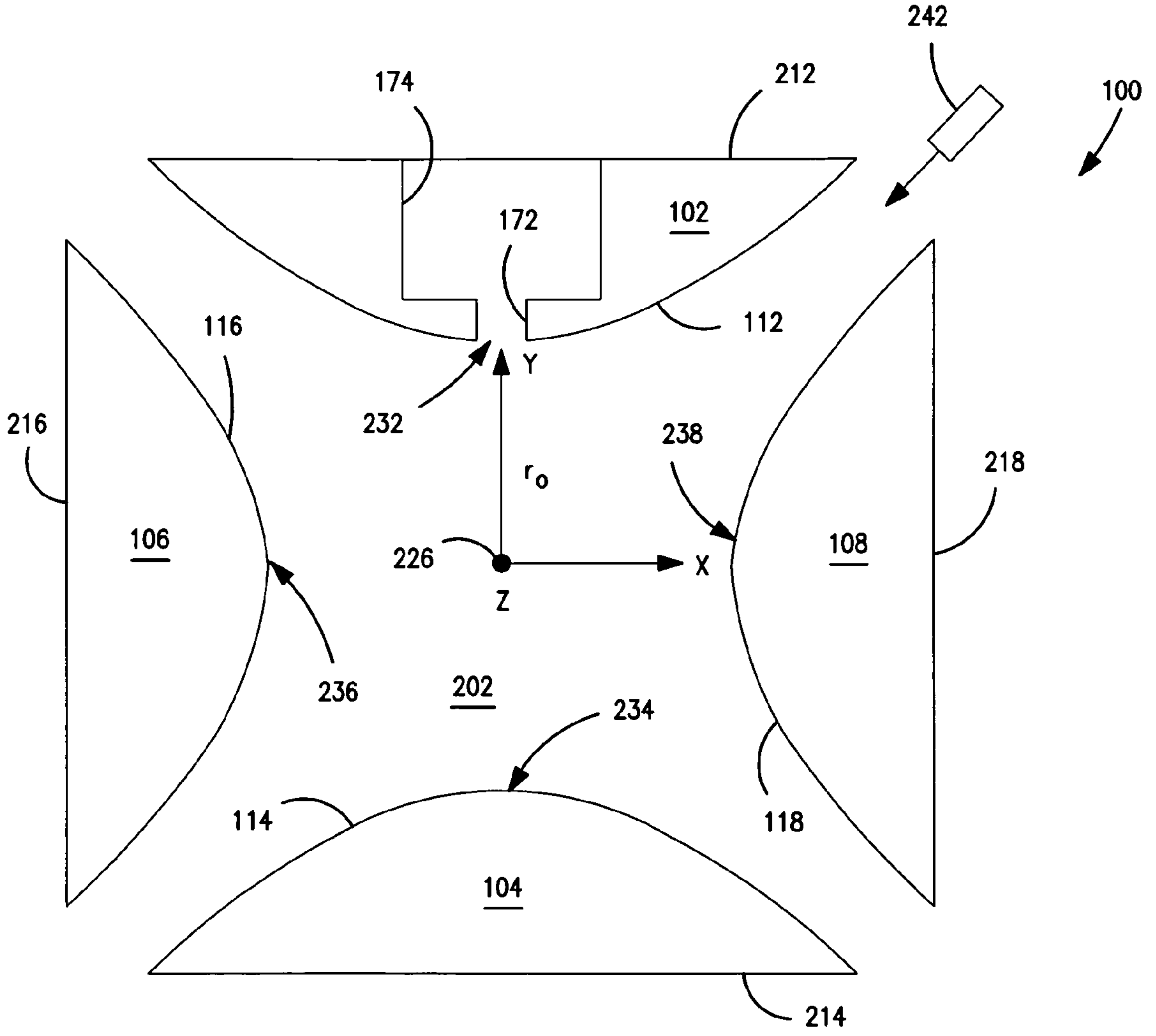
FIG. 2 is a cross-sectional view of the electrode structure illustrated in FIG. 1, taken in a radial plane orthogonal to the central axis of the electrode structure.
Figure 3:
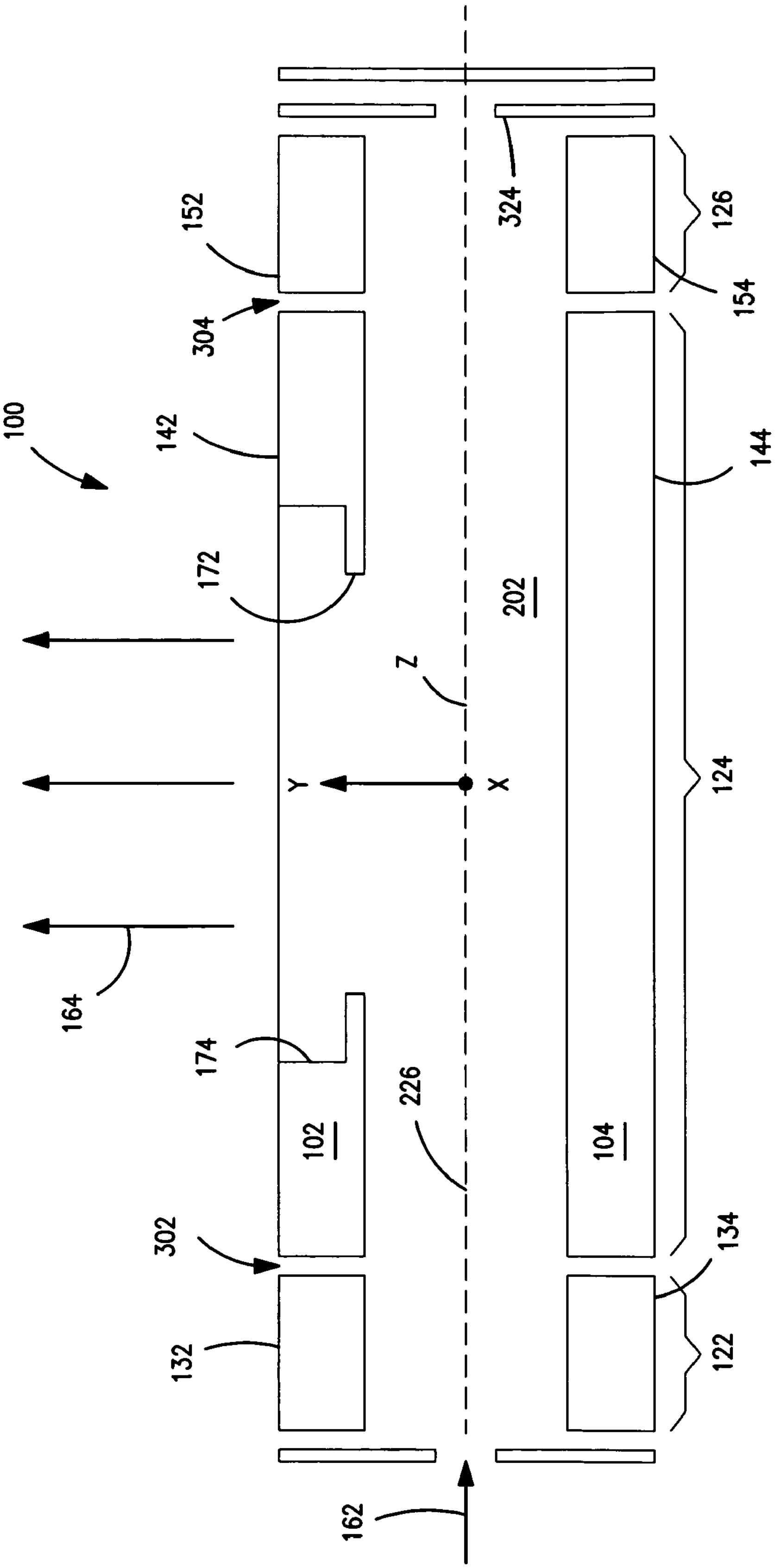
FIG. 3 is a cross-sectional view of the electrode structure illustrated in FIG. 1, taken in an axial plane orthogonal to the central axis.

FIGS. 1-3 illustrate an example of an electrode structure, arrangement, system, or device or rod set 100 of linear (two-dimensional) geometry that may be utilized to manipulate or process ions. FIGS. 1-3 also include a Cartesian (x, y, z) coordinate frame for reference purposes. For descriptive purposes, directions or orientations along the z-axis will be referred to as being axial, and directions or orientations along the orthogonal x-axis and y-axis will be referred to as being radial or transverse.

Referring to FIG. 1, the electrode structure 100 includes a plurality of electrodes 102, 104, 106 and 108 that are elongated along the z-axis. That is, each of the electrodes 102, 104, 106 and 108 has a dominant or elongated dimension (for example, length) that extends in directions generally parallel with the z-axis. In many implementations, the electrodes 102, 104, 106 and 108 are exactly parallel with the z-axis or as parallel as practicably possible. This parallelism can enable better predictability of and control over ion behavior during operations related to the manipulation and processing of ions in which RF fields are applied to the electrode structure 100, because in such a case the strength (amplitude) of an RF field encountered by an ion does not change with the axial position of the ion in the electrode structure 100. Moreover, with parallel electrodes 102, 104, 106 and 108, the magnitude of a DC potential applied end-to-end to the electrode structure 100 does not change with axial position.

In the example illustrated in FIG. 1, the plurality of electrodes 102, 104, 106 and 108 includes four electrodes: a first electrode 102, a second electrode 104, a third electrode 106, and a fourth electrode 108. In the present example, the first electrode 102 and the second electrode 104 are generally arranged as an opposing pair along the y-axis, and the third electrode 106 and the fourth electrode 108 are generally arranged as an opposing pair along the x-axis. Accordingly, the first and second electrodes 102 and 104 may be referred to as y-electrodes, and the third and fourth electrodes 106 and 108 may be referred to as x-electrodes. This example is typical of quadrupolar electrode arrangements for linear ion traps as well as other quadrupolar ion processing devices. In other implementations, the number of electrodes 102, 104, 106 and 108 may be other than four. Each electrode 102, 104, 106 and 108 may be electrically interconnected with one or more of the other electrodes 102, 104, 106 and 108 as required for generating desired electrical fields within the electrode structure 100. As also shown in FIG. 1, the electrodes 102, 104, 106 and 108 include respective inside surfaces 112, 114, 116 and 118 generally facing toward the center of the electrode structure 100.

FIG. 2 illustrates a cross-section of the electrode structure 100 in the x-y plane. The electrode structure 100 has an interior space or chamber 202 generally defined between the electrodes 102, 104, 106 and 108. The interior space 202 is elongated along the z-axis as a result of the elongation of the electrodes 102, 104, 106 and 108 along the same axis. The inside surfaces 112, 114, 116 and 118 of the electrodes 102, 104, 106 and 108 generally face toward the interior space 202 and thus in practice are exposed to ions residing in the interior space 202. The electrodes 102, 104, 106 and 108 also include respective outside surfaces 212, 214, 216 and 218 generally facing away from the interior space 202. As also shown in FIG. 2, the electrodes 102, 104, 106 and 108 are coaxially positioned about a main or central longitudinal axis 226 of the electrode structure 100 or its interior space 202. In many implementations, the central axis 226 coincides with the geometric center of the electrode structure 100. Each electrode 102, 104, 106 and 108 is positioned at some radial distance $r_0$ in the x-y plane from the central axis 226. In some implementations, the respective radial positions of the electrodes 102, 104, 106 and 108 relative to the central axis 226 are equal. In other implementations, the radial positions of one or more of the electrodes 102, 104, 106 and 108 may intentionally differ from the radial positions of the other electrodes 102, 104, 106 and 108 for such purposes as introducing certain types of electrical field effects or compensating for other, undesired field effects.

Each electrode 102, 104, 106 and 108 has an outer surface, and at least a section of the outer surface is curved. In the present example, the cross-sectional profile in the x-y plane of each electrode 102, 104, 106 and 108—or at least the shape of the inside surfaces 112, 114, 116 and 118—is curved. In some implementations, the cross-sectional profile in the x-y plane is generally hyperbolic to facilitate the utilization of quadrupolar ion trapping fields, as the hyperbolic profile more or less conforms to the contours of the equipotential lines that inform quadrupolar fields. The hyperbolic profile may fit a perfect hyperbola or may deviate somewhat from a perfect hyperbola. In some implementations, the deviation is intentionally done to modify field effects in a desired manner. In either case, each inside surface 112, 114, 116 and 118 is curvilinear and has a single point of inflection and thus a respective apex or vertex 232, 234, 236 and 238 that extends as a line along the z-axis. Each apex 232, 234, 236 and 238 is typically the point on the corresponding inside surface 112, 114, 116 and 118 that is closest to the central axis 226 of the interior space 202. In the present example, taking the central axis 226 as the z-axis, the respective apices 232 and 234 of the first electrode 102 and the second electrode 104 generally coincide with the y-axis, and the respective apices 236 and 238 of the third electrode 106 and the fourth electrode 108 generally coincide with the x-axis. In such implementations, the radial distance $r_0$ is defined between the central axis 226 and the apex 232, 234, 236 and 238 of the corresponding electrode 102, 104, 106 and 108.

In other implementations, the cross-sectional profiles of the electrodes 102, 104, 106 and 108 may be some non-ideal hyperbolic shape such as a circle, in which case the electrodes 102, 104, 106 and 108 may be characterized as being cylindrical rods. In still other implementations, the cross-sectional profiles of the electrodes 102, 104, 106 and 108 may be more rectilinear, in which case the electrodes 102, 104, 106 and 108 may be characterized as being curved plates. The terms "generally hyperbolic" and "curved" are intended to encompass all such implementations. In all such implementations, each electrode 102, 104, 106 and 108 may be characterized as having a respective apex 232, 234, 236 and 238 that faces the interior space 202 of the electrode structure 100.

As illustrated by way of example in FIG. 1, in some implementations the electrode structure 100 is axially divided into a plurality of sections or regions 122, 124 and 126 relative to the z-axis. In the present example, there are at least three regions: a first end region 122, a central region 124, and a second end region 126. Stated differently, the electrodes 102, 104, 106 and 108 of the electrode structure 100 may be considered as being axially segmented into respective first end sections 132, 134, 136 and 138, central sections 142, 144, 146 and 148, and second end sections 152, 154, 156 and 158. Accordingly, the first end electrode sections 132, 134, 136 and 138 define the first end region 122, the central electrode sections 142, 144, 146 and 148 define the central region 124, and the second end electrode sections 152, 154, 156 and 158 define the second end region 126. The electrode structure 100 according to the present quadrupolar example may also be considered as including twelve axial electrodes 132, 134, 136, 138, 142, 144, 146, 148, 152, 154, 156, and 158. In other implementations, the electrode structure 100 may include more than three axial regions 122, 124 and 126.

FIG. 3 illustrates a cross-section of the electrode structure 100 in the y-z plane but showing only the y-electrodes 102 and 104. The elongated dimension of the electrode structure 100 along the central axis 226, the elongated interior space 202, and the optional axial segmentation of the electrode structure 100 are all clearly evident. Moreover, in the present example, it can be seen that respective gaps 302 and 304 (axial spacing) exist between adjacent regions or sections 122, 124 and 124, 126. In other implementations, the electrodes 102, 104, 106 and 108 are unitary or single-section structures, with no gaps 302 and 304 and no physically distinct regions 122, 124 and 126. However, in some implementations, axial segmentation is considered advantageous because it enables the controlled application of discrete DC voltages to the individual regions 122, 124 and 126, among other reasons not immediately pertinent to the presently disclosed subject matter.

In the operation of the electrode structure 100, a variety of voltage signals may be applied to one or more of the electrodes 102, 104, 106 and 108 to generate a variety of axially- and/or radially-oriented electric fields in the interior space 202 for different purposes related to ion processing and manipulation. The electric fields may serve a variety of functions such as injecting ions into the interior space 202, trapping the ions in the interior space 202 and storing the ions for a period of time, ejecting the ions mass-selectively from the interior space 202 to produce mass spectral information, isolating selected ions in the interior space 202 by ejecting unwanted ions from the interior space 202, promoting the dissociation of ions in the interior space 202 as part of tandem mass spectrometry, and the like.

For example, one or more DC voltage signals of appropriate magnitudes may be applied to the electrodes 102, 104, 106 and 108 and/or axial end-positioned lenses or other conductive structures to produce axial (z-axis) DC potentials for controlling the injection of ions into the interior space 202. In some implementations, ions are axially injected into the interior space 202 via the first end region 122 generally along the z-axis, as indicated by the arrow 162 in FIGS. 1 and 3. The electrode sections 132, 134, 136 and 138 of the first end region 122, and/or an axially preceding ion-focusing lens or multi-pole ion guide, may be operated as a gate for this purpose. Some advantages of axial injection are described in co-pending U.S. patent application Ser. No. 10/855,760, filed May 26, 2004, titled "Linear Ion Trap Apparatus and Method Utilizing an Asymmetrical Trapping Field," which is commonly assigned to the assignee of the present disclosure. Generally, however, the electrode structure 100 is capable of receiving ions in the case of external ionization, or neutral molecules or atoms to be ionized in the case of internal or in-trap ionization, into the interior space 202 in any suitable manner and via any suitable entrance location.

Once ions have been injected or produced in the interior space 202, the DC voltage signals applied to one or more of the regions 122, 124 and 126 and/or to axially preceding and succeeding lenses or other conductive structures may be appropriately adjusted to prevent the ions from escaping out from the axial ends of the electrode structure 100. In addition, the DC voltage signals may be adjusted to create an axially narrower DC potential well that constrains the axial (z-axis) motion of the injected ions to a desired region within the interior space 202.

In addition to DC potentials, RF voltage signals of appropriate amplitude and frequency may be applied to the electrodes 102, 104, 106 and 108 to generate a two-dimensional (x-y), main RF quadrupolar trapping field to constrain the motions of stable (trappable) ions of a range of mass-to-charge ratios (m/z ratios, or simply "masses") along the radial directions. For example, the main RF quadrupolar trapping field may be generated by applying an RF signal to the pair of opposing y-electrodes 102 and 104 and, simultaneously, applying an RF signal of the same amplitude and frequency as the first RF signal, but 180° out of phase with the first RF signal, to the pair of opposing x-electrodes 106 and 108. The combination of the DC axial barrier field and the main RF quadrupolar trapping field forms the basic linear ion trap in the electrode structure 100.

Because the components of force imparted by the RF quadrupolar trapping field are typically at a minimum at the central axis 226 of the interior space 202 of the electrode structure 100 (assuming the electrical quadrupole is symmetrical about the central axis 226), all ions having m/z ratios that are stable within the operating parameters of the quadrupole are constrained to movements within an ion-occupied volume or cloud in which the locations of the ions are distributed generally along the central axis 226. Hence, this ion-occupied volume is elongated along the central axis

226 but may be much smaller than the total volume of the interior space 202. Moreover, the ion-occupied volume may be axially centered with the central region 124 of the electrode structure 100 through application of the non-quadrupolar DC trapping field that includes the above-noted axial potential well. In many implementations, the well-known process of ion cooling or thermalizing may further reduce the size of the ion-occupied volume. The ion cooling process entails introducing a suitable inert background gas (also termed a damping, cooling, or buffer gas) into the interior space 202. Collisions between the ions and the gas molecules cause the ions to give up kinetic energy, thus damping their excursions. Examples of suitable background gases include, but are not limited to, hydrogen, helium, nitrogen, xenon, and argon. As illustrated in FIG. 2, any suitable gas source 242, communicating with any suitable opening of the electrode structure 100 or enclosure of the electrode structure 100, may be provided for this purpose. Collisional cooling of ions may reduce the effects of field faults and improve mass resolution to some extent.

In addition to the DC and main RF trapping signals, additional RF voltage signals of appropriate amplitude and frequency (both typically less than the main RF trapping signal) may be applied to at least one pair of opposing electrodes 102/104 or 106/108 to generate a supplemental RF dipolar excitation field that resonantly excites trapped ions of selected m/z ratios. The supplemental RF field is applied while the main RF field is being applied, and the resulting superposition of fields may be characterized as a combined or composite RF field. Resonance excitation may be employed to promote or facilitate collision-induced dissociation (CID) or other ion-molecule interactions, or reactions with a reagent gas. In addition, the strength of the excitation field component may be adjusted high enough to enable ions of selected masses to overcome the restoring force imparted by the RF trapping field and be ejected from the electrode structure 100 for elimination, ion isolation, or mass-selective scanning and detection. Thus, in some implementations, ions may be ejected from the interior space 202 along a direction orthogonal to the central axis 226, i.e., in a radial direction in the x-y plane. For example, as shown in FIGS. 1 and 3, ions may be ejected along the y-axis as indicated by the arrows 164. As appreciated by persons skilled in the art, this type of ion ejection may be performed on a mass-selective basis by, for example, maintaining the supplemental RF excitation field at a fixed frequency while ramping the amplitude of the main RF trapping field.

In addition, certain experiments, including CID processes, may require that desired ions of a selected m/z ratio or ratios be retained in the electrode structure 100 for further study or procedures, and that the remaining undesired ions having other m/z ratios be removed from the electrode structure 100. Any suitable technique may be implemented by which the desired ions are isolated from the undesired ions. In particular, radial ejection is also useful for performing ion isolation. For example, a supplemental RF signal may be applied to a pair of opposing electrodes of the electrode structure 100, such as the y-electrodes 102 and 104 that include the aperture 172, to generate a supplemental RF dipole field in the interior space 202 between these two opposing electrodes 102 and 104. The supplemental RF signal ejects undesired ions of selected m/z values from the trapping field by resonant excitation along the y-axis. Examples of techniques employed for ion isolation include, but are not limited to, those described in U.S. Pat. Nos. 5,198,665 and 5,300,772, commonly assigned to the assignee of the present disclosure, as well as U.S. Pat. Nos. 4,749,860; 4,761,545; 5,134,286; 5,179,278; 5,324,939; and 5,345,078.

It will be understood, however, that dipolar resonant excitation is but one example of a technique for increasing the amplitudes of ion motion and radially ejecting ions from a linear ion trap. Other techniques are known and applicable to the electrode structures described in the present disclosure, as well as techniques or variations of known techniques not yet developed.

To facilitate radial ejection, one or more apertures may be formed in one or more of the electrodes 102, 104, 106 or 108. In the specific example illustrated in FIGS. 1-3, an aperture 172 is formed in one of the y-electrodes 102 to facilitate ejection in a direction along the y-axis in response to a suitable supplemental RF dipolar field being produced between the y-electrodes 102 and 104. The aperture 172 may be elongated along the z-axis, in which case the aperture 172 may be characterized as a slot or slit, to account for the elongated ion-occupied volume produced in the elongated interior space 202 of the electrode structure 100. In practice, a suitable ion detector (not shown) may be placed in alignment with the aperture 172 to measure the flux of ejected ions. To maximize the number of ejected ions that pass completely through the aperture 172 without impinging on the peripheral walls defining the aperture 172 and thus reach the ion detector, the aperture 172 may be centered along the apex 232 (FIG. 2) of the electrode 102, the cross-sectional area of the aperture 172 available for ion ejection may be uniform, and the depth of the aperture 172 through the thickness of the electrode 102 may be optimized. A recess 174 may be formed in the electrode 102 that extends from the outside surface 212 (FIG. 2) to the aperture 172 and surrounds the aperture 172 to minimize the radial channel or depth of the aperture 172 through which the ejected ions must travel. Such a recess 174, if provided, may be considered as being part of the outside surface 212.

To maintain a desired degree of symmetry in the electrical fields generated in the interior space 202, another aperture 176 may be formed in the electrode 104 opposite to the electrode 102 even if another corresponding ion detector is not provided. Likewise, apertures may be formed in all of the electrodes 102, 104, 106 and 108. In some implementations, ions may be preferentially ejected in a single direction through a single aperture by providing an appropriate superposition of voltage signals and other operating conditions, as described in the above-cited U.S. patent application Ser. No. 10/855,760.

As previously noted, many structural features of electrode structures cause field distortions that may detrimentally affect ion processing and manipulation during certain modes of operation. With regard to the electrode structure 100 illustrated in FIGS. 1-3, the aperture(s) 172 may be a significant source of undesired field deviations. To a lesser extent, the necessary truncation (finite extent of physical dimensions) of the electrodes 102, 104, 106 and 108 also causes field deviations. Some approaches toward addressing these problems such as stretching the displacements of the electrodes 102, 104, 106 and 108, modifying their shapes, and providing external shim electrodes have been noted above. See, e.g., U.S. Patent App. Pub. No. US 2002/0185596 A1; U.S. Pat. No. 6,087,658; Schwartz et al., "A Two-Dimensional Quadrupole Ion Trap Mass Spectrometer," J. Am. Soc. Mass. Spectrom., Vol. 13, 659-669 (April 2002). Another approach has been to minimize the dimensions (length and width) of the aperture 172. See, e.g., U.S. Pat. No. 6,797,950. However, there is a limit to such minimization. The ion trapping volume or cloud within the electrode structure 100 must be kept elongated to maintain an acceptable level of ion ejection/detection efficiency, as the size of the aperture 172 determines how many of the ions will actually be successfully ejected through the aperture 172 and reach the ion detector. While the DC voltages could be adjusted to axially compress the ion trapping volume, this can result in increased space charge and consequently shifts in mass spectral peaks. Moreover, even if optimally sized, the aperture 172 nonetheless causes field defects for which compensation would be desirable.

By way of example, the implementations of electrodes, electrode arrangements and related components and methods described below are provided to address these problems.

Figure 4:
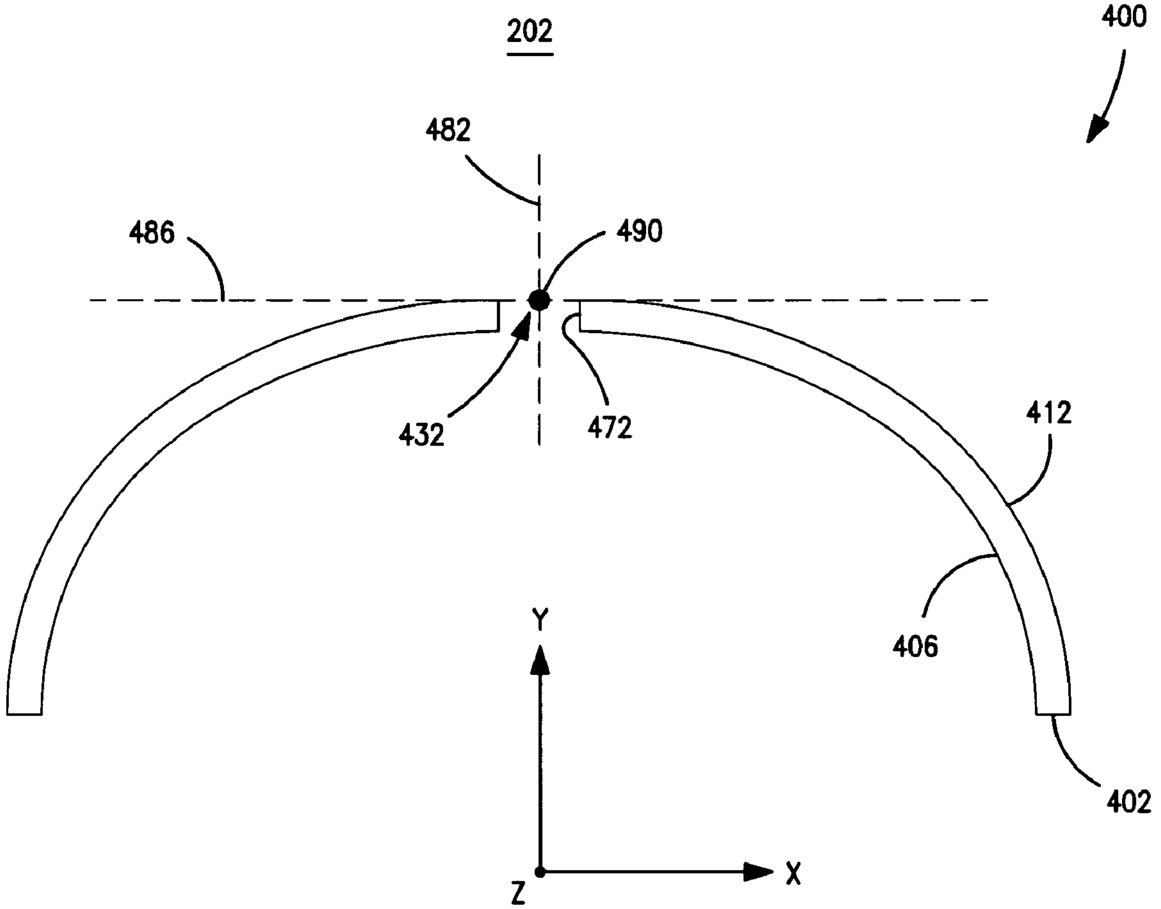
FIG. 4 is a cross-sectional view of an example of a main or trapping electrode and a field compensation electrode provided in accordance with implementations described in the present disclosure.

FIG. 4 is a cross-sectional view of a main or trapping electrode 400 provided in accordance with one implementation of the present disclosure. The electrode 400 may be employed as one or more of the electrodes 102, 104, 106 and 108 of the electrode structure 100 illustrated in FIGS. 1-3 or in any other suitable linear arrangement of electrodes. The outer surface of the electrode 400 may include an outside surface 402 that may include a recess 406, and an opposing inside surface 412. The inside surface 412 faces toward the top of the drawing sheet where, from the perspective of FIG. 4, the interior space 202 of the electrode structure 100 would be located. At least a portion of the outer surface of the electrode 400 is a curved section. In the present example, the inside surface 412 of the electrode 400 has a generally curved or hyperbolic profile with an apex 432 generally facing toward the interior space 202 and away from the outside surface 402. When assembled as part of the electrode structure 100 such as for a linear ion trap, the apex 432 is the portion of the inside surface 412 closest to the central axis 226 (FIGS. 2 and 3) of the electrode structure 100. The electrode 400 may have an axially oriented, elongated aperture or slot 472 that is generally collinear with the apex 432 or centerline of the electrode 400. The electrode 400 may thus be referred to as an apertured or aperture-containing electrode. The cross-sectional view of FIG. 4 is taken at a section of the electrode 400 where the aperture 472 is located. The aperture 472 is generally disposed along a center line or axis of symmetry 482 of the aperture 472. This center line 482 is orthogonal to the z-axis or central axis 226 of the electrode structure 100 in a radial (x or y) direction. The aperture 472 extends along the center line 482 through the radial thickness of the electrode 400 from the inside surface 412 to the outside surface 402 (or to the recess 406 of the outside surface 402 if provided). A tangent line 486 extends along another radial direction (y or x) that is orthogonal to the center line 482 and to the z-axis or central axis 226 of the electrode structure 100. The tangent line 486 is tangent to the curvature of the inside surface 412 at the apex 432.

As further illustrated in FIG. 4, a field compensation electrode 490 is provided as a means for compensating for field imperfections such as those discussed above. The field compensation electrode 490 may also be referred to as a multipole tuning electrode. The utilization of the compensation electrode 490 is particularly beneficial when ejecting ions through the aperture 472 as explained in more detail below. Thus, implementations providing the compensation electrode 490 may enhance the performance of an ion trap or other ion-processing device in which the main electrode 400 with the compensation electrode 490 is employed. For instance, these implementations may increase mass resolution and minimize mass shifts and the occurrence of peak broadening in mass spectra obtained from MS experiments in which a linear electrode system such as the electrode structure 100 illustrated in FIGS. 1-3 is employed as an ion trap-based mass analyzer or other ion processing device.

As illustrated in FIG. 4, the compensation electrode 490 may be positioned proximate to the aperture 472 where the field defects of interest are most significant. When provided as part of the electrode structure 100 (FIGS. 1-3), the compensation electrode 490 may be positioned in the interior space 202, and at a radial distance from the central axis 226 that is less than the radial distance $r_0$ of the main electrode 400 from the central axis 226. In some implementations, the compensation electrode 490 is aligned with the aperture 472 of the main electrode 400 such that the compensation electrode 490 is positioned generally along the center line 482 of the aperture 472. That is, at least a portion of the compensation electrode 490 coincides with the center line 482, or a portion of the compensation electrode 490 at least touches the center line 482 (the outer surface of the compensation electrode 490 is tangent to the center line 482). In some implementations, the center line 482 runs generally through the center of the compensation electrode 490 such that the compensation electrode 490 is centrally aligned with the aperture 472. In some implementations, the compensation electrode 490 is positioned generally along the tangent line 486 of the inside surface 412 of the main electrode 400. That is, at least a portion of the compensation electrode 490 coincides with the tangent line 486, or a portion of the compensation electrode 490 at least touches the tangent line 486 (the outer surface of the compensation electrode 490 is tangent to the tangent line 486). Accordingly, along the radial direction of the center line 482, the compensation electrode 490 may be positioned outside the aperture 472 and, when assembled as part of the electrode structure 100, inside the interior space 202. The compensation electrode 490 may be disposed entirely inside the interior space 202, although the compensation electrode 490 may be elongated enough such that one or both of its ends extend beyond the axial ends of the corresponding main electrode 400.

The compensation electrode 490 may have any size and shape suitable for performing its compensating function. In some implementations, the compensation electrode 490 is provided in the form of a cylindrical rod or wire and has a circular cross-section as illustrated in FIG. 4. The diameter of the cross-section of the compensation electrode 490 may be a small fraction of the width of the aperture 472 to ensure that ion transmission through the aperture 472 occurs at an acceptable maximum, for example, approximately 95% or greater ion transmission. The compensation electrode 490 may be mounted directly to the main electrode 400. Alternatively, any suitable mounting or structural means may be utilized to properly position the compensation electrode 490 relative to the main electrode 400 and the aperture 472.

The compensation electrode 490 may be constructed from any suitable electrically conductive material or from a conductive or insulating core material that is coaxially surrounded by a conductive material. Preferably, the compensation electrode 490 is substantially rigid to ensure its position is uniform in the axial direction relative other components. Suitable conductive materials include, but are not limited to, tungsten, gold, platinum, silver, copper, molybdenum, titanium, nickel, and combinations, alloys, compounds, or solid mixtures including one or more materials such as these. The compensation electrode 490 may have outer plating, a coating, or the like such as, for example, gold, that is applied to ensure the compensation electrode 490 has a uniform outer surface.

Figure 5:
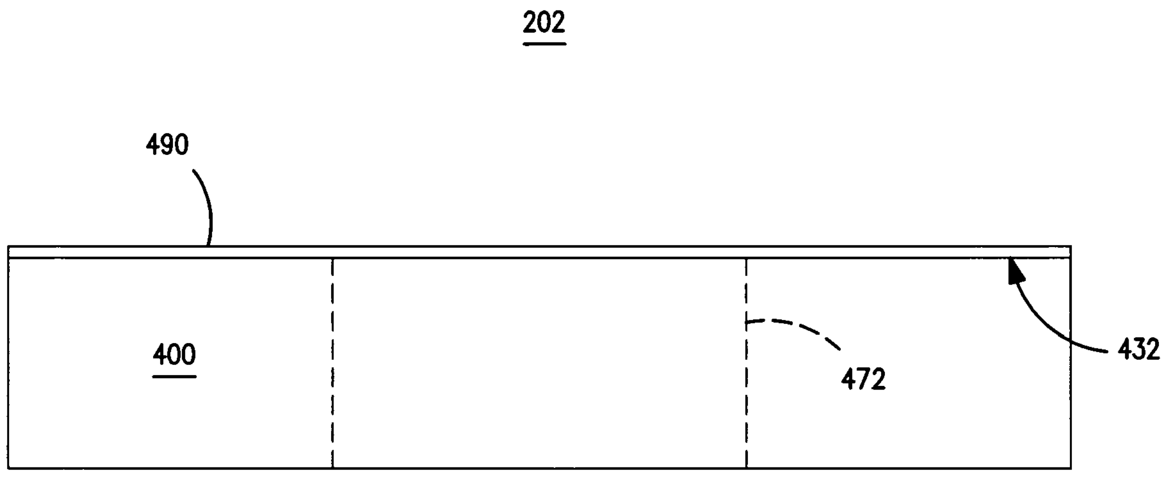
FIG. 5 is a top elevation view of the main electrode and compensation electrode illustrated in FIG. 4 and arranged according to an implementation described in the present disclosure.

FIG. 5 is a top plan view of the main electrode 400 and the compensation electrode 490 illustrated in FIG. 4. In this implementation, the compensation electrode 490 is attached or mounted directly to the main electrode 400 in registration with the apex 432. The attachment or mounting may be effected by any suitable means such as contact welding, soldering, or the like. In this implementation, the compensation electrode 490 directly contacts the main electrode 400 and thus is in electrical communication with the main electrode 400. Accordingly, any RF or DC voltage signals applied to the main electrode 400 will also be applied to the compensation electrode 490.

Figure 6:
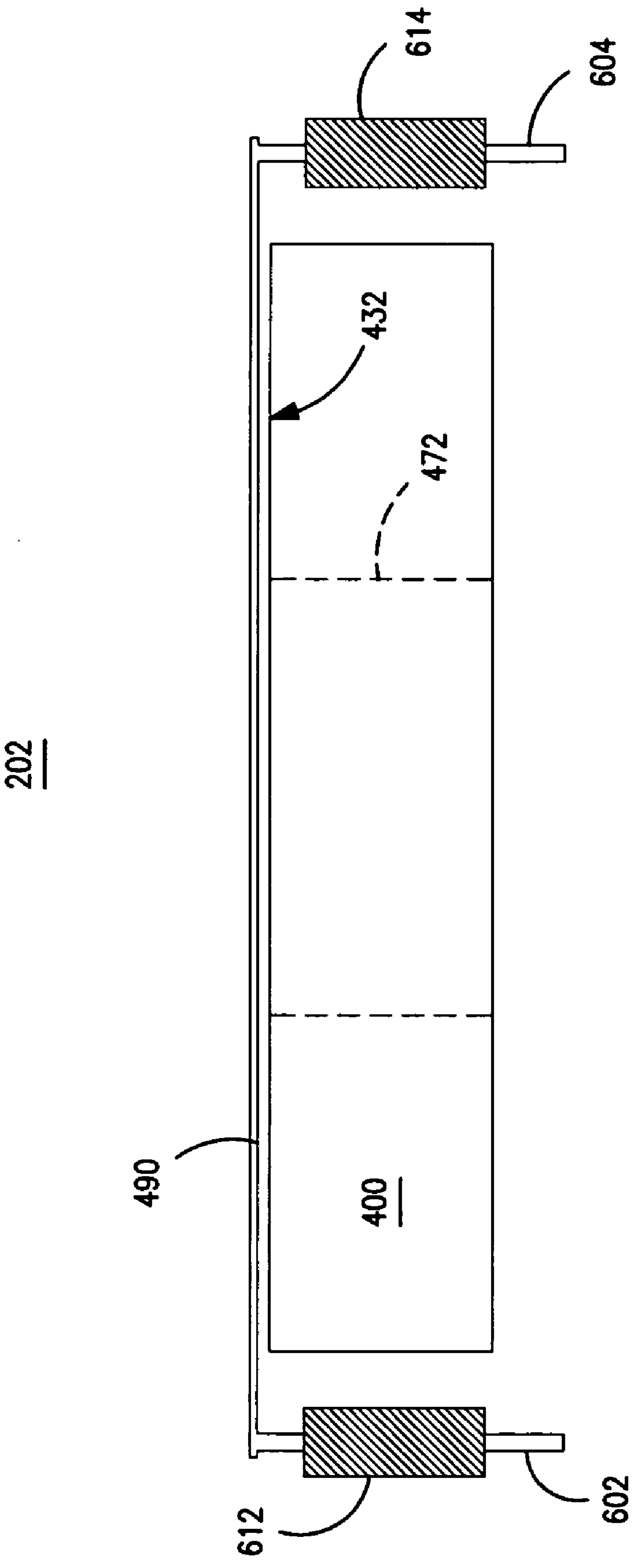
FIG. 6 is a top elevation view of the main electrode and compensation electrode illustrated in FIG. 4 and arranged according to another implementation described in the present disclosure.

FIG. 6 is a top plan view of the main electrode 400 and the compensation electrode 490 illustrated in FIG. 4 according to another implementation. In this implementation, the compensation electrode 490 does not contact the main electrode 400 and thus is electrically isolated from the main electrode 400. Instead, the compensation electrode 490 is mounted or suspended by any suitable means such that the compensation electrode 490 registers with the apex 432 and is positioned relative to the aperture 472 in a desired manner. For instance, the compensation electrode 490 may be supported by structural members that are positioned so as not to impair ion processing operations. As an example, the compensation electrode 490 may be attached or mounted to electrically conductive contact elements or interconnects 602 and 604 such as by contact welding, soldering, or the like. The contacts 602 and 604 may be respectively positioned proximal to the axial ends of the main electrode 400, and may be respectively supported in any suitable type of insulators 612 and 614. In this implementation, because the compensation electrode 490 is electrically isolated from the main electrode 400, either the same or different voltages may be applied to the compensation electrode 490. Accordingly, this implementation in practice may provide greater flexibility in utilizing the compensation electrode 490 to address deleterious field imperfections in the interior space 202 of an ion-processing device during a given mode of operation.

The compensation electrode 490 may have any suitable axial length. As examples, the axial length of the compensation electrode 490 may be less than, substantially equal to, equal to, or greater than the axial length of the main electrode 400. For implementations such as illustrated in FIG. 5, providing a compensation electrode 490 that is shorter than or substantially equal to the main electrode 400 in axial length may facilitate placing the compensation electrode 490 in electrical contact with the main electrode 400, as the ends of the compensation electrode 490 may be attached directly to respective locations on the inside surface 412 of the main electrode 400 beyond the axial ends of the aperture 472. For implementations such as illustrated in FIG. 6, providing a compensation electrode 490 that is substantially equal to or greater than the main electrode 400 in axial length may facilitate suspending the compensation electrode 490 relative to the main electrode 400 by utilizing structural and/or conductive elements, such as the contacts 602 and 604, that do not interfere with the electrode structure 100 (FIGS. 1-3) or its interior space 202.

In one non-limiting example, the main electrode 400 has an axial length of approximately 1000 mm and a transverse width of approximately 30 mm. The aperture 472 has an axial length of approximately 30 mm and a transverse width of approximately 1 mm. The compensation electrode 490 has an axial length of approximately 1000 mm and a transverse width or diameter of approximately 0.0254 mm.

Figure 7:
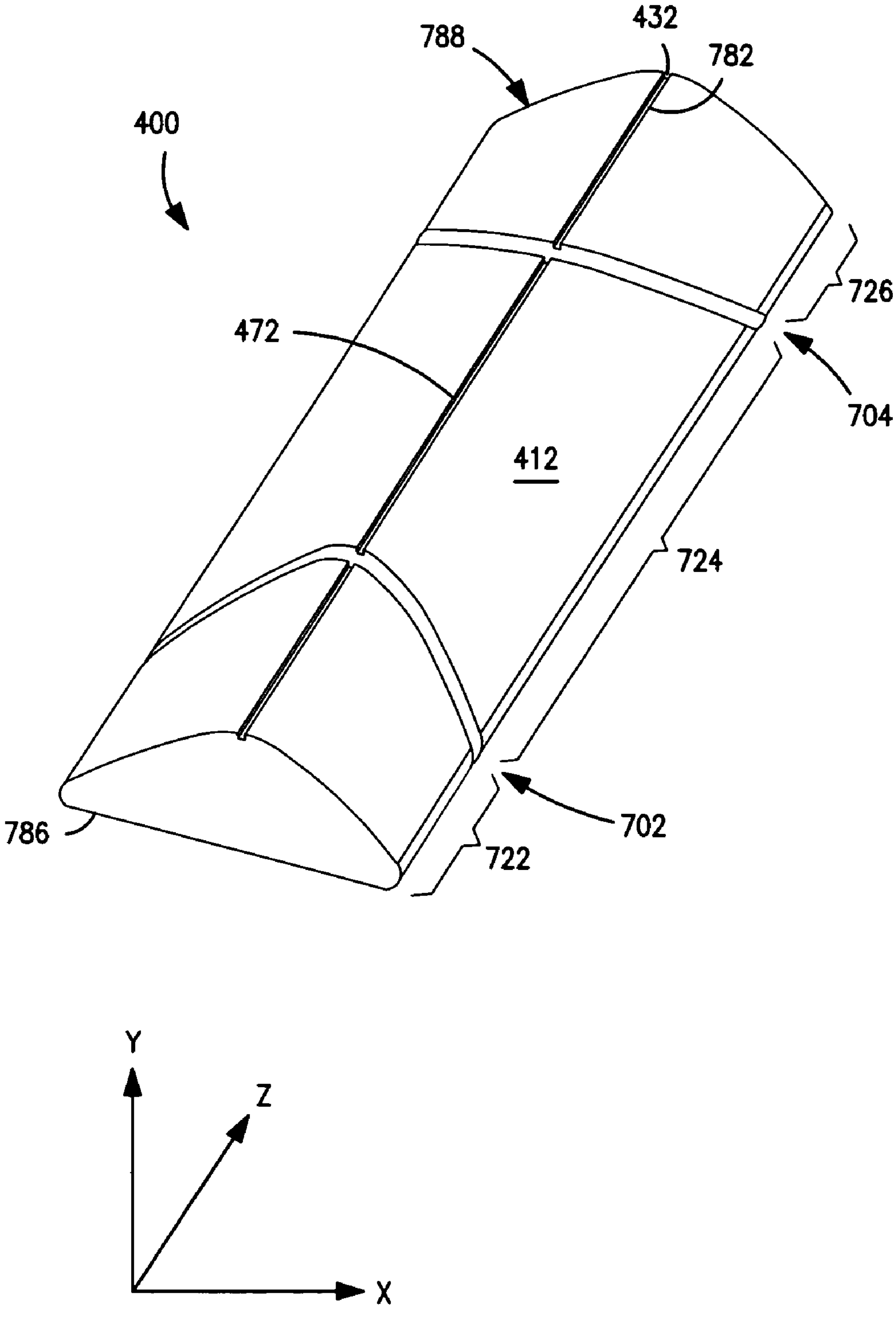
FIG. 7 is a perspective view of the main electrode illustrated in FIG. 4 according to another implementation described in the present disclosure.

FIG. 7 is a perspective view of the main electrode 400 according to another implementation. An elongated surface feature such as an axial groove 782 is formed along a length of the main electrode 400. The groove 782 may extend along the entire length of the main electrode 400 from one axial end face 786 to the other axial end face 788, or the groove 782 may extend along only a portion of the main electrode 400. The groove 782 may be generally collinear with the centerline of the width of the electrode 400. Hence, in implementations where the inside surface 412 of the electrode 400 has a hyperbolic or other curved profile and the apex 432 of the profile is generally positioned along the centerline of the electrode 400, the groove 782 is generally located at the apex 432 of the inside surface 412. Accordingly, a portion of the groove 782 may serve as the aperture 472 or the beginning of the aperture 472. From the axial groove 782, the depth of the aperture 472 is continued radially through the thickness of the main electrode 400 to the outside surface 402 or to a recess 406 of the outside surface 402 if provided (FIG. 4). The groove 782, however, is continued axially beyond the axial extent of the aperture 472. The portions of the groove 782 spanning the length of the main electrode 400 on either side of the aperture 472 extend into the radial or transverse thickness of the main electrode 400 to some depth, but not far enough as to constitute through-bores or channels that communicate with the outer surface 402 of the main electrode 400 as in the case of the aperture 472. For example, the depth of the groove 782 may be about the same as the width of the aperture 472, or it may be greater or less than the width of the aperture 472. In some implementations, the width of the groove 782 is the same or substantially the same as the width of the aperture 472. In some implementations, the width of the groove 782 is the same or substantially the same as the width of the aperture 472. In some implementations, the axial length of the groove 782 is at least approximately twice the axial length of the aperture 472 or greater.

The provision of the groove 782 may facilitate the positioning of the compensation electrode 490 relative to the main electrode 400, either in the case of direct electrical contact as illustrated in FIG. 5 or proximal mounting as illustrated in FIG. 6. Depending on the depth of the groove 782 and the cross-sectional dimension of the compensation electrode 490, all or part of the compensation electrode 490 may be disposed in the groove 782. In some implementations, the groove 782 may be characterized as being part of the interior space 202 (FIGS. 2-6) of an associated multi-electrode structure. In such implementations, the compensation electrode 490 when positioned in the groove 782 may nonetheless be characterized as being positioned in the interior space 202 and outside of the aperture 472.

FIG. 7 also illustrates that the main electrode 400 may be axially segmented into a first end electrode section 722, a central electrode section 724, and a second end electrode section 726, with respective gaps 702 and 704 defined between the adjacent sections 722, 724 and 724, 726, in a manner similar to that shown in FIGS. 1 and 3. In other implementations, the main electrode 400 is not axially segmented and instead has a single-section construction, as previously noted. The groove 782 may provide other advantages for ion processing and manipulation as disclosed in a co-pending U.S. patent application titled "Two-Dimensional Electrode Constructions for Ion Processing," commonly assigned to the assignee of the present disclosure. This co-pending U.S. patent application also discloses that the axial length of the aperture 472 may be 100% of the axial length of the central electrode section 724 at the apex 432 of the central electrode section 724, and that the gaps 702 and 704 may be oriented at an oblique angle to the z-axis and to the x-y plane.

In some implementations, the aperture 472 may be considered as being the portion of the groove 782 that spans the central electrode section 724. In other implementations, the aperture 472 and the groove 782 may be considered as being separate and distinct features, the groove 782 may be considered as being a feature of the inside surface 412, and thus the volume in the groove 782 may be considered as being part of the interior space 202 (FIGS. 2 and 3). It will also be noted that in implementations in which the aperture 472 and/or the groove 782 are aligned with the line of the apex 432 of the inside surface 412, a portion of the apex 432 may not actually be part of the solid body of the main electrode 400. This is because the aperture 472 or groove 782 defines the boundaries of a space, or an absence of material. Hence, in these implementations, the apex 432 may be characterized as being located in space at the point of inflection of a curve extending beyond the inside surface 412. The aperture 472 and/or the groove 782 may be characterized as being located at the apex 432, in alignment with the apex 432, or in an apical region of the main electrode 400 near the apex 432.

The functions and advantages of the compensation electrode 490 may be better understood through the discussion below and by referring to FIGS. 8-35.

Figure 8:
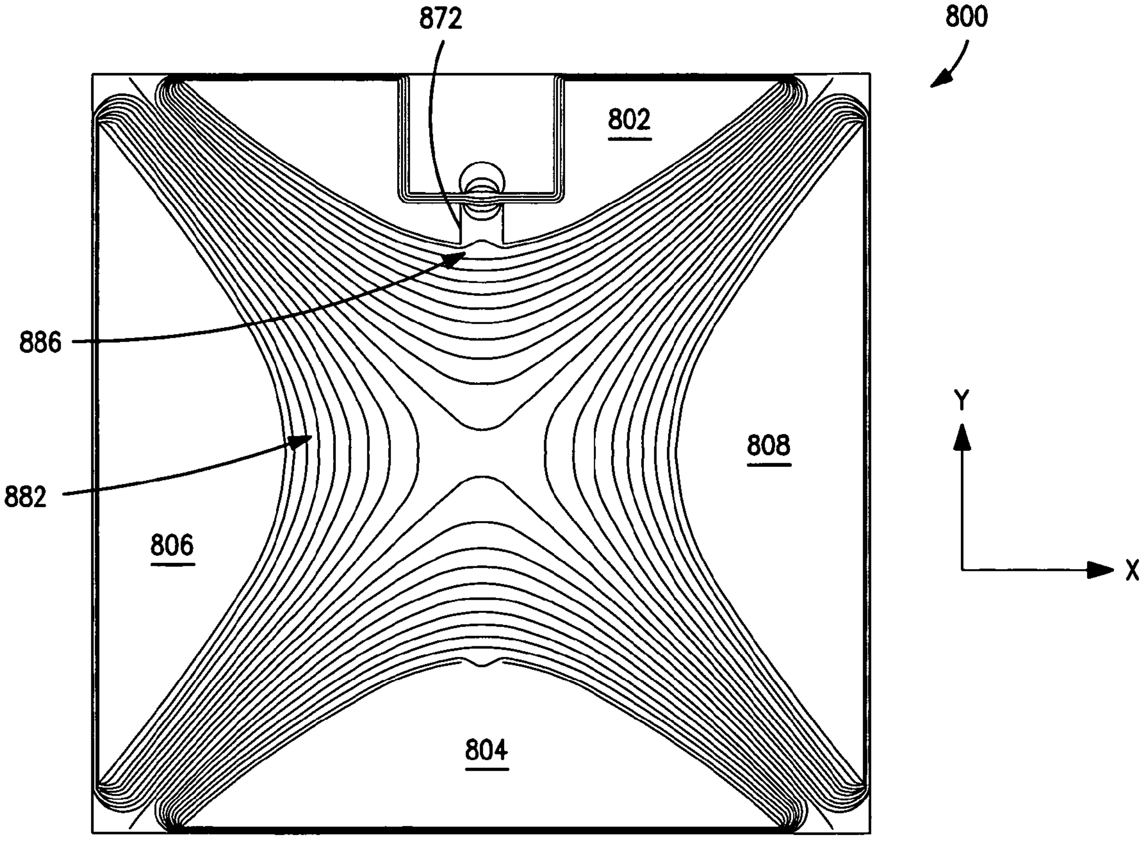
FIG. 8 is a cross-sectional view of an electrode structure having a single aperture for ejecting ions, and illustrating an RF field being applied.

FIG. 8 illustrates a cross-section of an electrode structure 800 in the x-y plane similar to that shown in FIG. 2, where like reference numerals designate like components or features. An RF quadrupolar trapping field has been applied to the electrode structure 800, and is visualized in FIG. 8 by equipotential lines 882 (lines of constant electrical potential). It is observed that the equipotential lines 882 uniformly conform to the ideal quadrupole electric field, except for a region 886 of the trapping field adjacent to the ion exit aperture 872 of the electrode 802 where it can be seen that the potential lines are distorted. Since the force on an ion due to the electrical field is related to the gradient of the electrical potential, the increased spacing of the equipotential lines 882 in the region 886 of the aperture 872 indicates that the electrical field is becoming weakened in this region 886. As previously noted, it is known to effect collisions between the ions and a low-mass gas such as helium to remove excess kinetic energy (i.e., collision "cooling") and cause the ions to collapse to the center of the trapping field after the ions are formed or injected into the trapping field. To eject the ions or increase their amplitudes of oscillation for other purposes, an alternating, supplemental excitation potential may be applied to opposing electrodes (in the present example, the y-electrodes 802 and 804) to form a resonant dipolar RF driving field. The natural oscillation frequency of the ions in the trapping field may then be increased by increasing the amplitude of the trapping voltage. When the natural oscillation frequency of ions of a given m/z ratio in the trapping field is matched to the frequency of the resonant driving field applied to the opposing electrodes, the amplitude of the ion oscillation increases and the kinetic energy of the ions increases as the ions move in a given direction along the axis of the applied resonant dipole. In time, the amplitude of the ion oscillation increases until the ions are ejected from the field.

The frequency of oscillation of the ions is a function of the force on the ions in the trapping field. For a perfect quadrupole field, no significant other multipole moments are present and the restoring force is a linear function of the displacement of the ions from the center of the field. By contrast, in the real case depicted in FIG. 8, the reduction in the strength of the electric field (restoring force) near the aperture 872 in the electrode 802 results in the frequency of oscillation of the ions being reduced. This causes ions near the aperture 872 to go out of resonance with the resonant driving force on the electrodes 802, 804, 806 and 808. Therefore, the ions are delayed from achieving resonance with the applied resonant driving field until the amplitude of the trapping potential can be increased sufficiently to increase the natural oscillation frequency of the ions to match the driving frequency. This causes a time delay in the ejection of the ions from the trapping region. Since collisions with the surrounding damping gas are also occurring, this can also result in a loss of ion kinetic energy. This loss of kinetic energy further delays the ejection of the ion. Since collision cross-sections are dependent on the structure of the ions, the time delays will be dependent on the ion structure.

Figure 9:
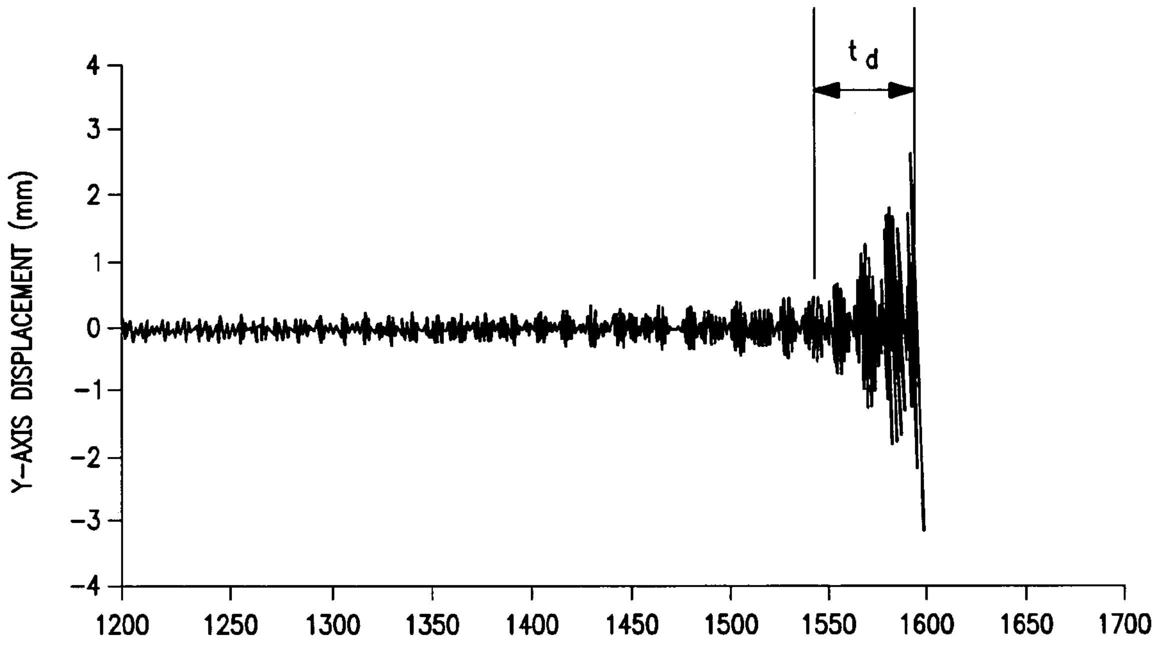
FIG. 9 is a plot of y-axis ion displacement (in mm) as a function of time (in μs) for an ideal quadrupole ion trapping field.

FIG. 9 illustrates the ejection of ions along the y-axis in an ideal ion trap in which the trapping electrodes extend to large distances in all directions and do not have any holes or slots such as the aperture 872 shown in FIG. 8. Specifically, FIG. 9 is a plot of y-axis ion displacement (in mm) as a function of time (in μs). The ion trajectory was calculated by the software tool SIMION™ developed at the Idaho National Engineering and Environmental Laboratory, Idaho Falls, Id. The rapid increase in the ion amplitude of oscillation along the y-axis with time in response to application of a supplemental excitation potential is seen to occur in time $t_d$.

Figure 10:
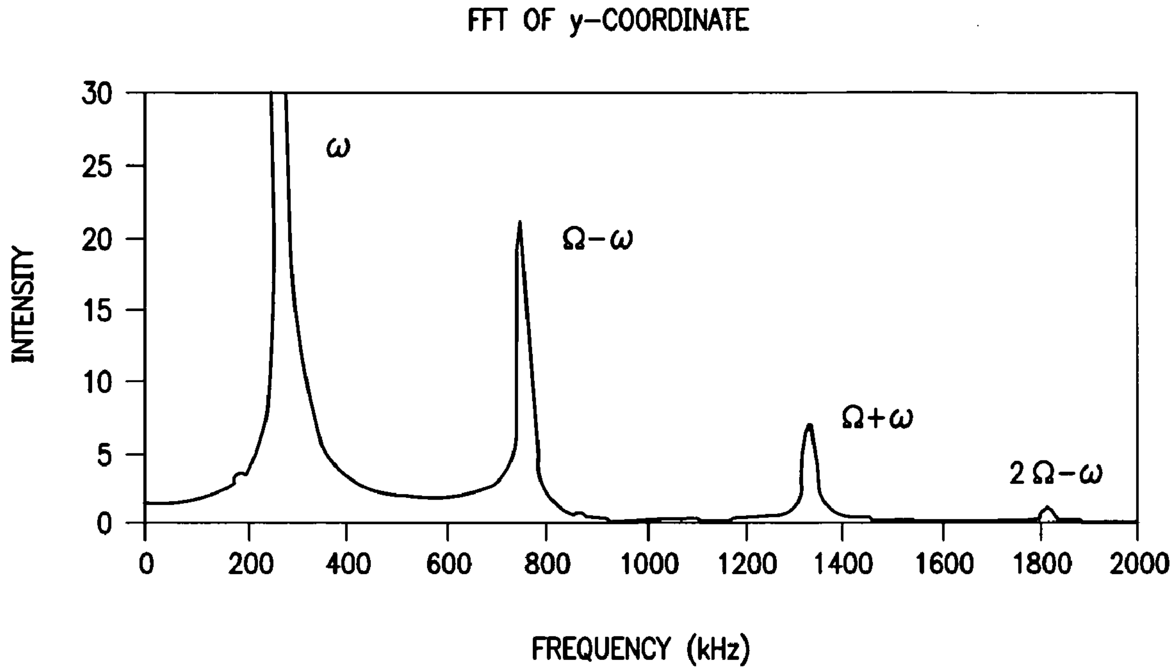
FIG. 10 illustrates a Fast Fourier Transform (FFT) analysis of calculated ion motion in the ideal quadrupole trapping field from the time domain into the frequency domain (in kHz).

FIG. 10 is a plot of ion signal intensity (in arbitrary relative units) as a function of frequency (in kHz), illustrating the Fast Fourier Transform (FFT) of the calculated ion motion in the ideal quadrupole trapping field from the time domain into the frequency domain, where the trapping field is applied at a trapping frequency Ω. The expected fundamental (natural oscillation frequency) ω and the side bands Ω±ω are observed. No other frequencies are observed.

Figure 11:
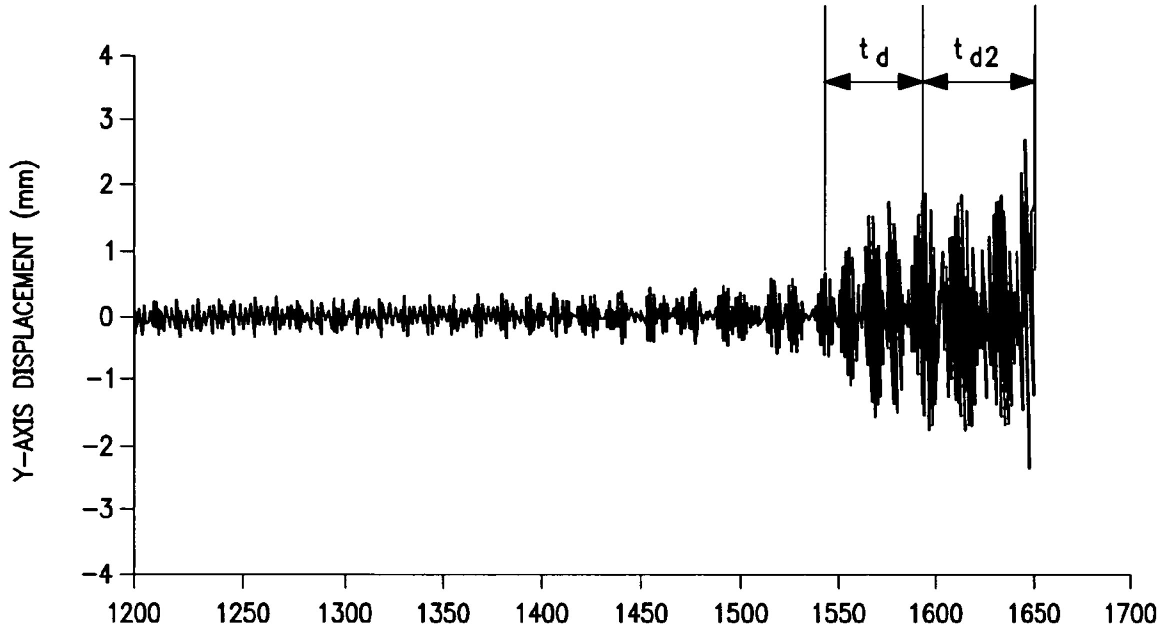
FIG. 11 is a plot of y-axis ion displacement (in mm) as a function of time (in μs) for a real trapping field.
Figure 12:
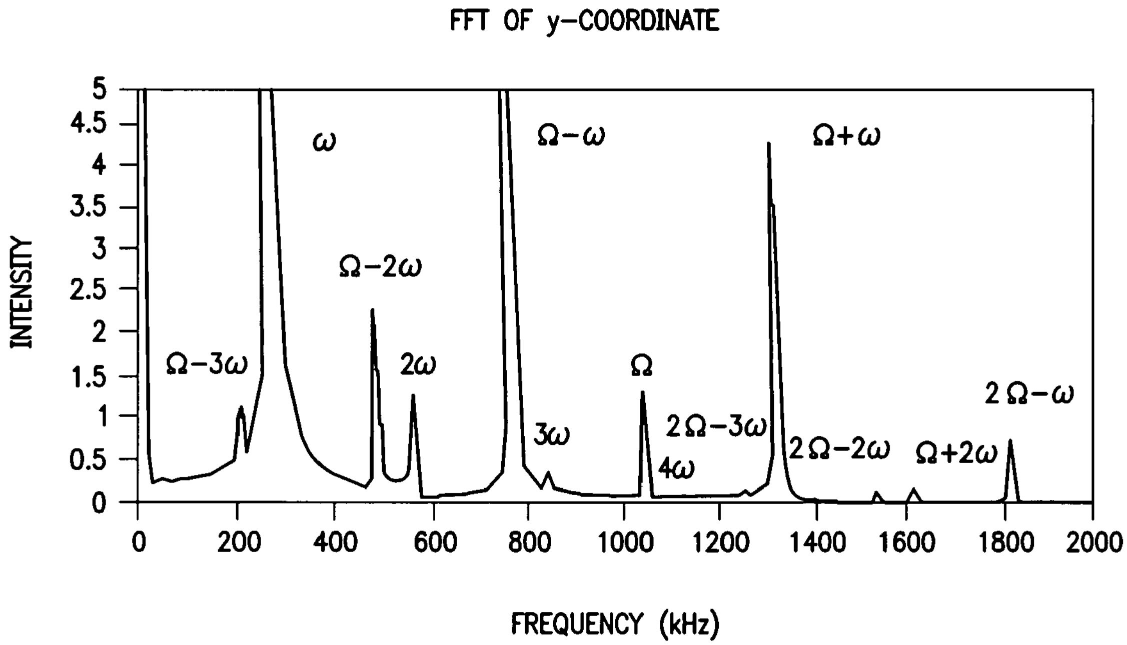
FIG. 12 illustrates a Fast Fourier Transform (FFT) analysis of calculated ion motion in the real trapping field from the time domain into the frequency domain (in kHz).

The information in FIGS. 9 and 10 may be compared to the information in FIGS. 11 and 12. FIG. 11 shows the ion motion as a function of time in a real trapping field such as illustrated in FIG. 8, in which two opposing electrodes (for example, the y-electrodes 802 and 804) have been displaced by 10% of the ideal separation and one of the electrodes has an ion exit slot (for example, the aperture 872). The 10% "stretch" in displacement compensates for the truncation of the electrodes to a finite extent. See, e.g., J. Franzen et al., *Practical Aspects of Ion Trap Mass Spectrometry*; March, R. E.; Todd, J. F. J; Editors; CRC Press (1995). It can be seen that the ion ejection is delayed by an additional time $t_{d2}$ due to the defects in the trapping field introduced by the presence of the slot. This is caused by the ions moving out of resonance with the driving field due to the weakened trapping field in the region near the ion exit slot (for example, the region 886 near the aperture 872 in FIG. 8).

FIG. 12 shows the Fourier transform of the ion motion in the non-ideal field. A number of new nonlinear resonances can be observed due to higher-order multipole moments superposed on the quadrupole trapping field. The multipoles are caused by the imperfections (distortions) in the trapping field. Because only one slot is present, the field is asymmetrical in the x-axis plane. Therefore, odd-order resonances can be observed that are indicated by the presence of the fundamental trapping frequency Ω, and overtones of the trapping frequency 2Ω, 3Ω, etc. and higher-order side bands 2Ω±2ω, etc.

Figure 13:
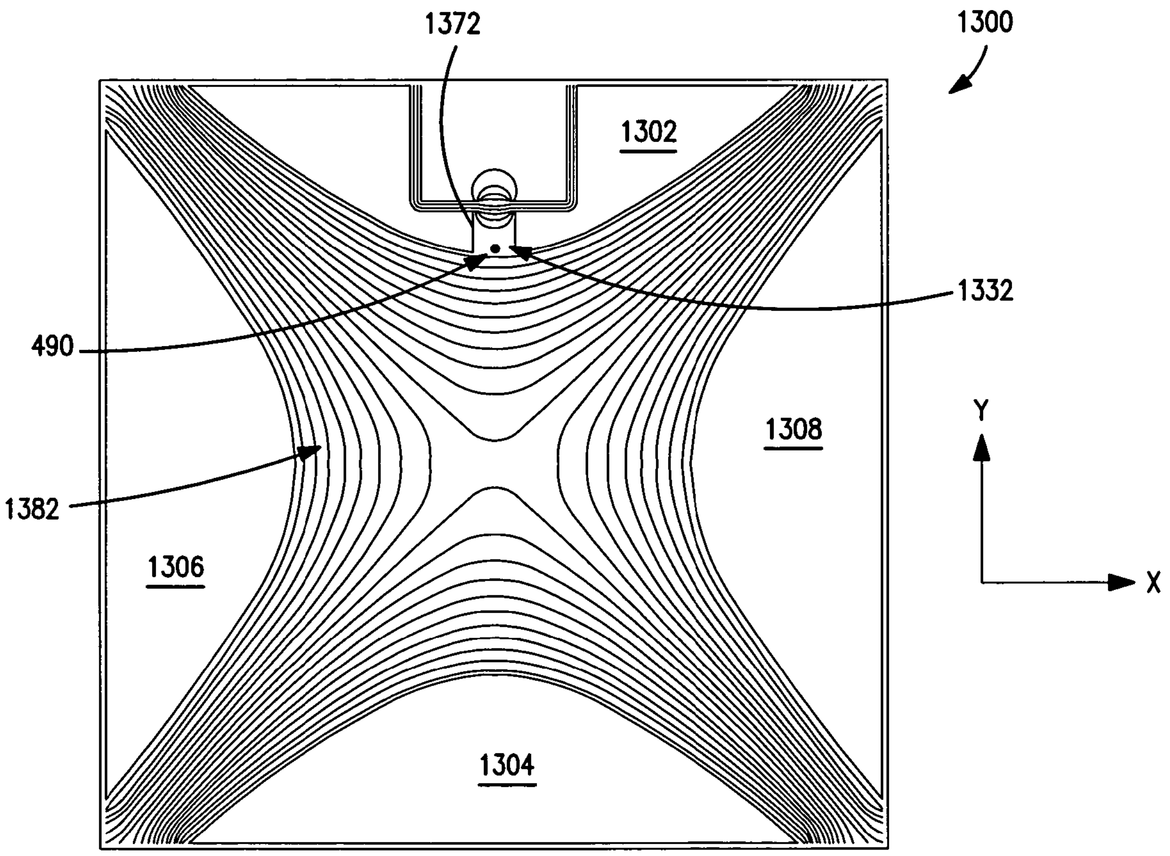
FIG. 13 is a cross-sectional view of an electrode structure provided in accordance with implementations described in the present disclosure, in which the electrode structure includes a compensation electrode.
Figure 14:
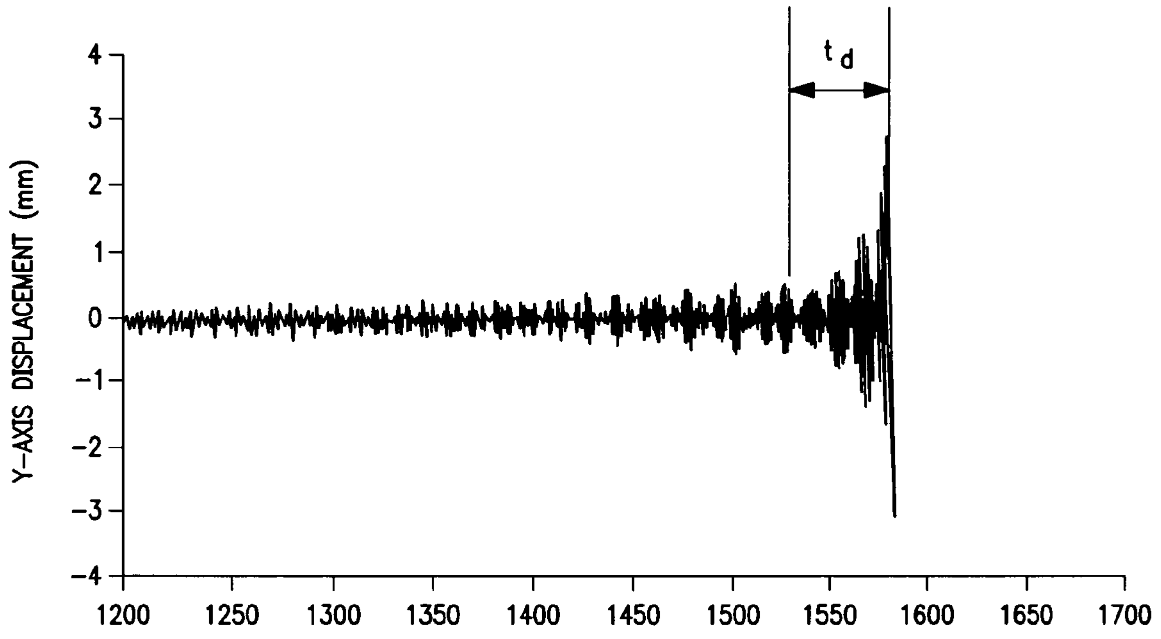
FIG. 14 is a plot of y-axis ion displacement (in mm) as a function of time (in μs) for a real trapping field such as depicted in FIG. 13, for which compensation is provided by the compensation electrode according to implementations described in the present disclosure.
Figure 15:
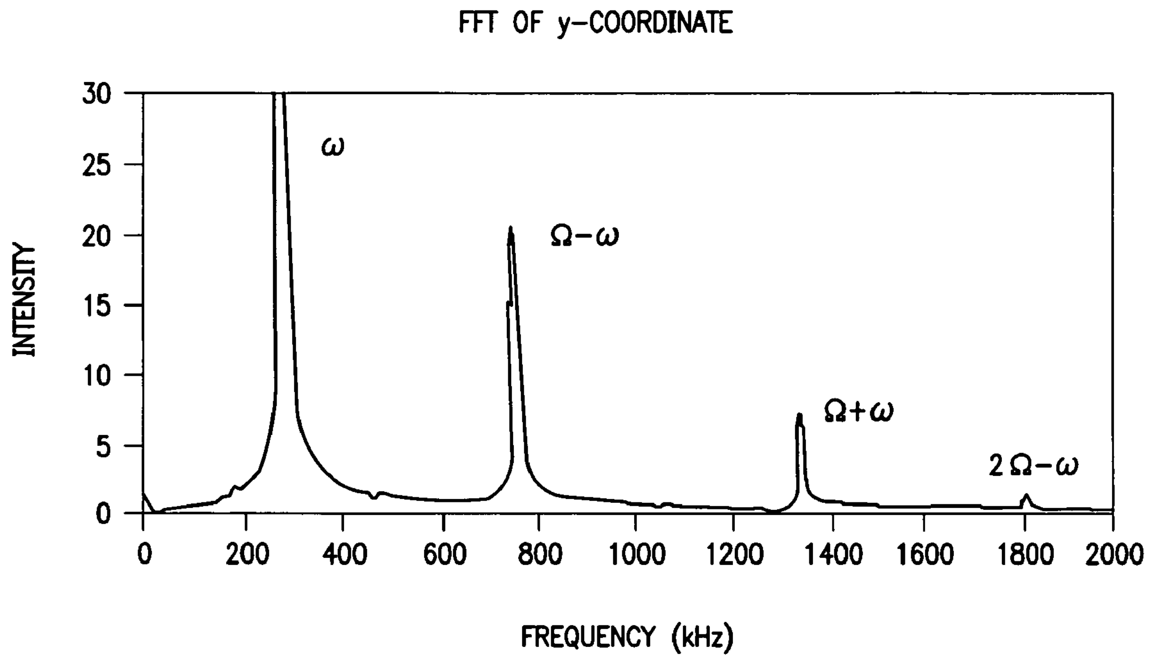
FIG. 15 is illustrates a Fast Fourier Transform (FFT) analysis of calculated ion motion in the RF field depicted in FIG. 13.

FIGS. 13-15 illustrate the advantages of properly operating the compensation electrode 490 to improve certain processes such as ion ejection. FIG. 13 illustrates a cross-section of an electrode structure 1300 in the x-y plane similar to that shown in FIG. 8, where like reference numerals designate like components or features. A single compensation electrode 490 has been added to the electrode structure 1300, and located where the apex 1332 of the hyperbolic or curved electrode 1302 would be if the slot or aperture 1372 were not present. The addition of the compensation electrode 490, operated in the present example at or near the trap electrode potential for purposes of ion ejection, results in a significant reduction of the distortion of the equipotential lines 1382. The weakened-field region 886 shown in FIG. 8 has largely been eliminated, and the quadrupole trapping field closely approximates the ideal or perfect case.

FIG. 14 shows the simulation of ion motion and ejection as a function of time in the compensated trapping field illustrated in FIG. 13. It is observed that the response of the ion in the compensated trapping field is similar to that observed in the ideal field (FIG. 9). The elimination of the additional time delay in ejection $t_{d2}$ (FIG. 11) is a direct result of the elimination of the higher-order multipole moments resulting from the non-ideal trapping field, which in turn is the result of the compensation electrode 490 being operated at a voltage appropriately proportional (e.g., near or equal) to the voltage applied to the trapping electrodes.

FIG. 15 shows the resulting Fourier transform of the ion motion in the compensated field. It is observed that the higher-order nonlinear resonances due to the defects in the trapping field such as shown in FIG. 12 have now been eliminated by the addition of the compensation electrode 490. Accordingly, the results of the FFT analysis illustrated in FIG. 15 are similar to the results illustrated in the ideal case of FIG. 10.

Figure 16:
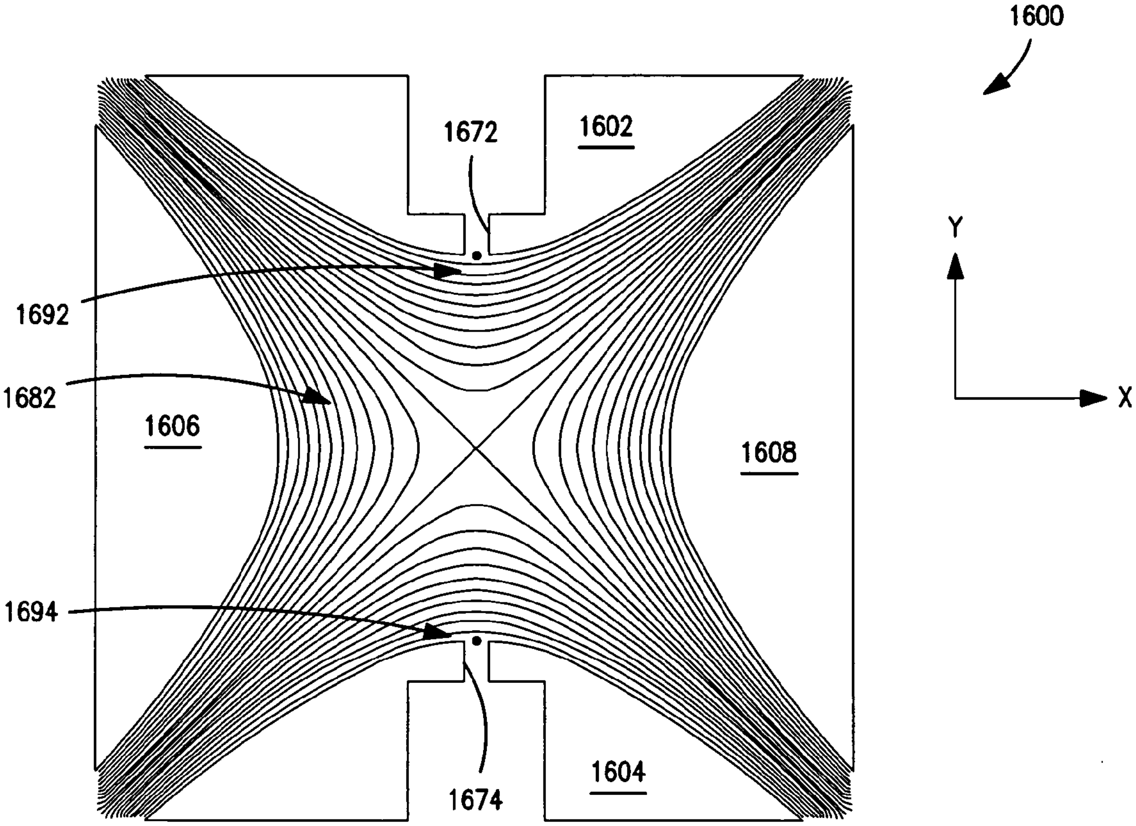
FIG. 16 is a cross-sectional view of an electrode structure provided in accordance with other implementations described in the present disclosure, in which two opposing main electrodes have respective apertures and the electrode structure includes two corresponding compensation electrodes.
Figure 17:
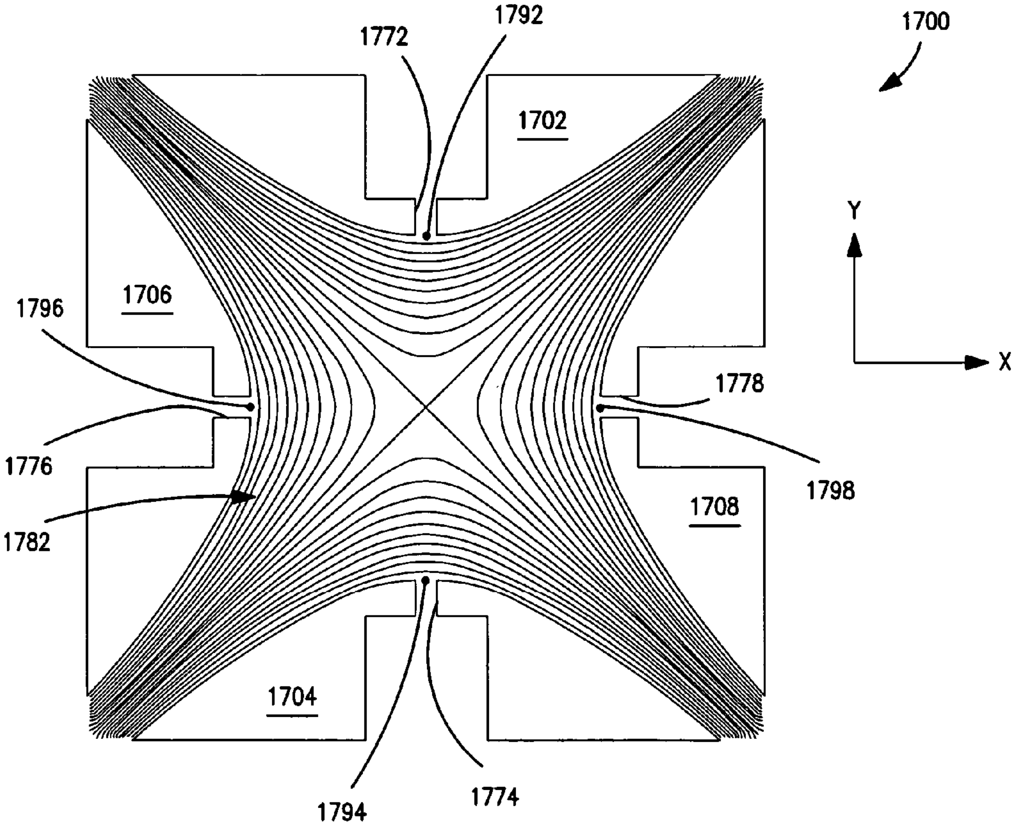
FIG. 17 is a cross-sectional view of an electrode structure provided in accordance with other implementations described in the present disclosure, in which each of the two opposing pairs of main electrodes have respective apertures and the electrode structure includes four corresponding compensation electrodes.

FIGS. 16 and 17 illustrate additional examples of implementations of the present disclosure. As previously noted, an electrode structure such as the electrode structures 100, 800, and 1300 respectively illustrated in FIGS. 1-3, 8, and 13 may include more than one aperture. Moreover, the electrode structure may include a corresponding number of ion detectors (not shown) such that each ion detector receives a flux of ions ejected from a corresponding ion exit aperture. Alternatively, the number of ion detectors may be less than the number of apertures. In all such implementations, a field compensation electrode may be provided proximate to each aperture and operated so as to optimize ion ejection through the corresponding aperture as described above. Hence, in the example of FIG. 16, an electrode structure 1600 includes a plurality of main or trapping electrodes 1602, 1604, 1606 and 1608. The opposing y-axis electrodes 1602 and 1604 have respective apertures 1672 and 1674 and corresponding compensation electrodes 1692 and 1694. When appropriate voltages are applied to the compensation electrodes 1692 and 1694, the RF field 1682 is optimized for ion ejection at both apertures 1672 and 1674 as shown in FIG. 16. In the example of FIG. 17, an electrode structure 1700 includes a plurality of main or trapping electrodes 1702, 1704, 1706 and 1708. Both the y-axis electrodes 1702 and 1704 and the x-axis electrodes 1706 and 1708 have respective apertures 1772, 1774, 1776 and 1778 and corresponding compensation electrodes 1792, 1794, 1796 and 1798. Appropriate voltages may be applied to the compensation electrodes 1792, 1794, 1796 and 1798 to optimize the RF field 1782 as shown in FIG. 17.

The implementations described thus far, as illustrated for example in FIGS. 13, 16 and 17, are advantageous for ejecting ions quickly from the trapping field and thus may be optimal for operations such as ion isolation, ion detection, and mass-selective scanning. The field compensations effected by these implementations, however, are not necessarily advantageous for exciting ions for purposes other than ejection such as CID, as will now be described below.

Figure 18:
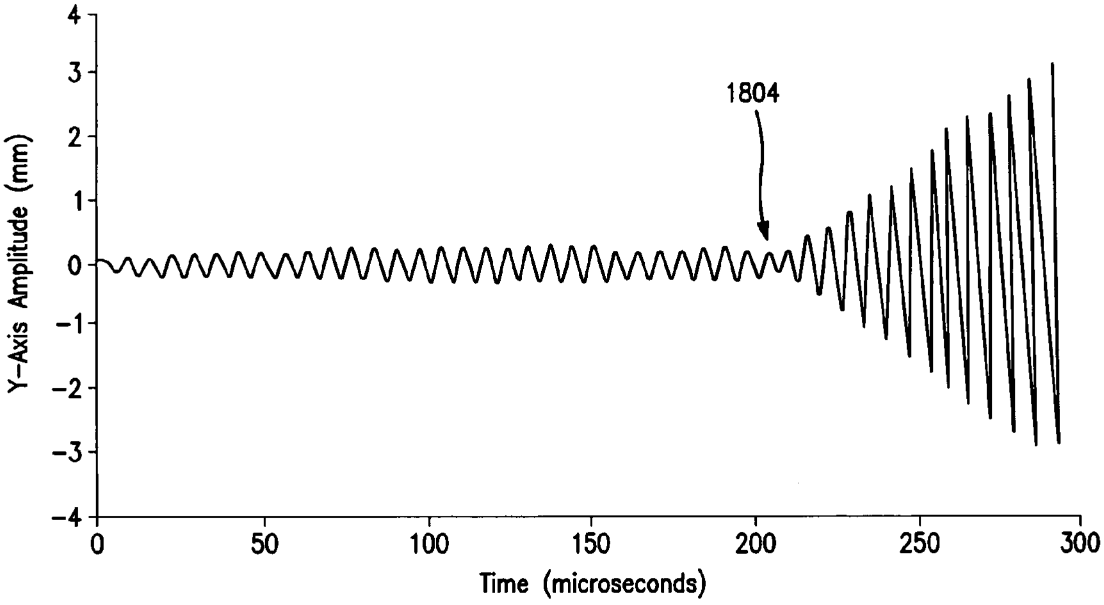
FIG. 18 is a plot of y-axis ion displacement (in mm) as a function of time (in μs) for a simulation that includes resonant excitation and in which the trapping field has been compensated such that it approximates an ideal quadrupole field.

FIG. 18 is a simulation of ion motion in a linear ion trap of the type illustrated in FIG. 16 for an ion of m/z=300. Specifically, FIG. 18 is a plot of y-axis ion displacement (in mm) as a function of time (in μs). The RF trapping voltage was set to 300 V at a driving frequency of 1050 MHz. The trapping field has been compensated such that it approximates an ideal quadrupole field in the manner described above. The ion has been trapped and damped by collisions to the center of the trapping field. At a time approximately 200 microseconds into the simulation, indicated generally at 1804, an alternating supplemental excitation voltage was applied to the trapping electrodes oriented in the y-axis direction. In a given application, the starting time for applying the supplemental voltage may correspond to the starting point for initiating a CID process or any other process in which increasing the amplitude of ion oscillation is desired. The supplemental voltage was set to 1.0 V at a resonant frequency of 150 kHz. The resonant frequency of the supplemental potential was equal to the secular frequency of the trapped ion. It can be seen in FIG. 18 that the amplitude of oscillation of the ion increases linearly in time until the amplitude exceeds the location of the trapping electrodes and, consequently, the ion is lost from the trapping field either by striking one of the electrodes or escaping through an aperture or other opening.

Figure 19:
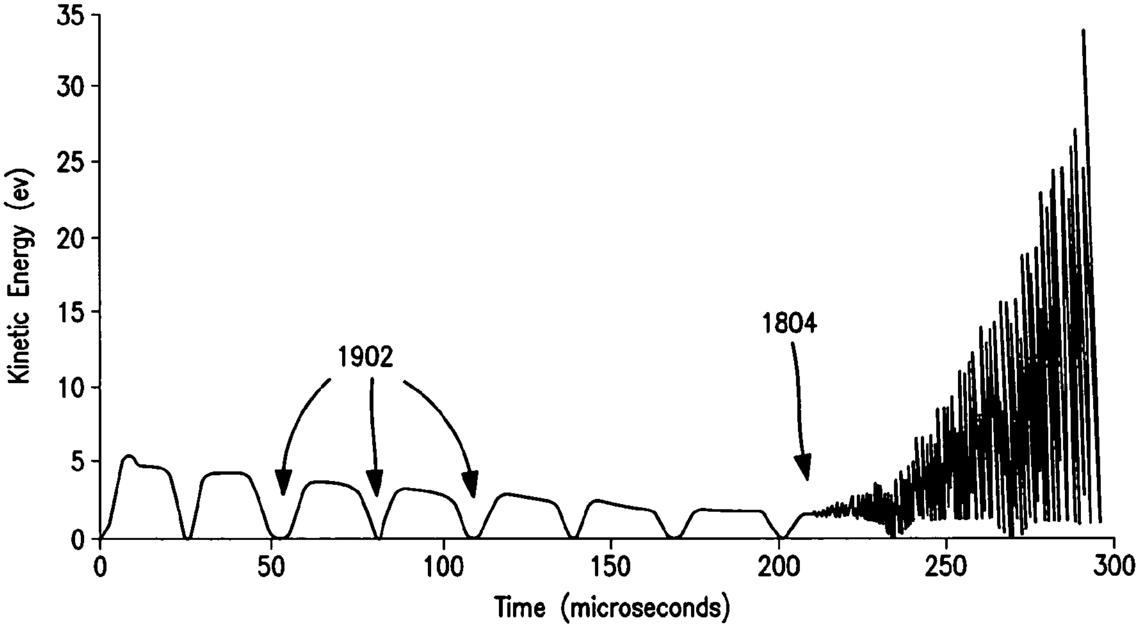
FIG. 19 is a plot of the calculated kinetic energy (in eV) of the ion simulated in FIG. 18 as a function of time (in μs).

FIG. 19 illustrates a plot of the calculated kinetic energy (in eV) of the ion simulated in FIG. 18 as a function of time (in μs). It is observed that the kinetic energy of the ion progressively decreases due to damping collisions. The kinetic energy is reduced to nearly zero when the ion turns around at the radial ends of the trapping field (along the y-axis in the present example), as indicated by turning points 1902. The kinetic energy of the ion increases after the supplemental (CID) voltage is turned on at the point in time 1804.

Figure 20:
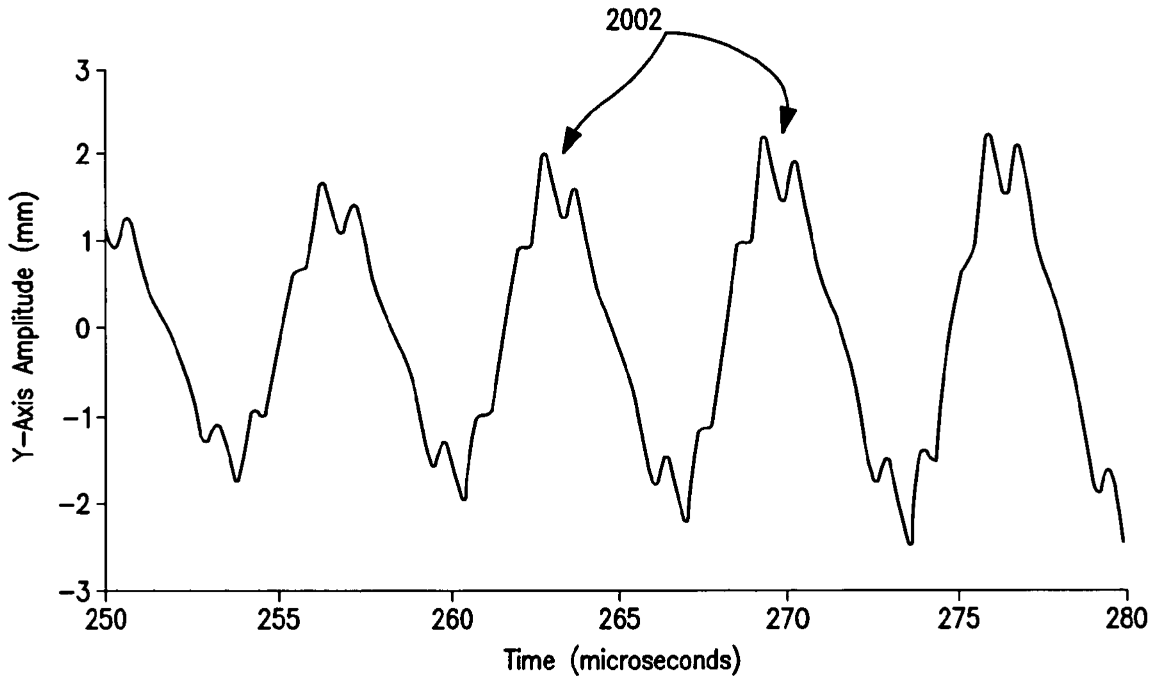
FIG. 20 shows an expanded region of the simulation of the y-axis motion in FIG. 18 corresponding to a portion of the resonant excitation stage.

FIG. 20 shows an expanded region of the simulation of the y-axis motion in FIG. 18 corresponding to a portion of the resonant excitation stage subsequent to the starting point 1804 for CID. Micro-motion of the ion is observed as indicated for example at 2002. The micro-motion is due to the RF trapping field that produces a time averaged restoring force, in addition to motions due to the side-band oscillations at higher frequency resulting from the superposition of oscillations of the driving frequency Ω of the trapping voltage and the slower oscillations of the mass-specific secular frequency ω of ion motion (e.g., Ω±ω). The trapping field produces instantaneous rapid accelerations and decelerations of the ion.

Figure 21:
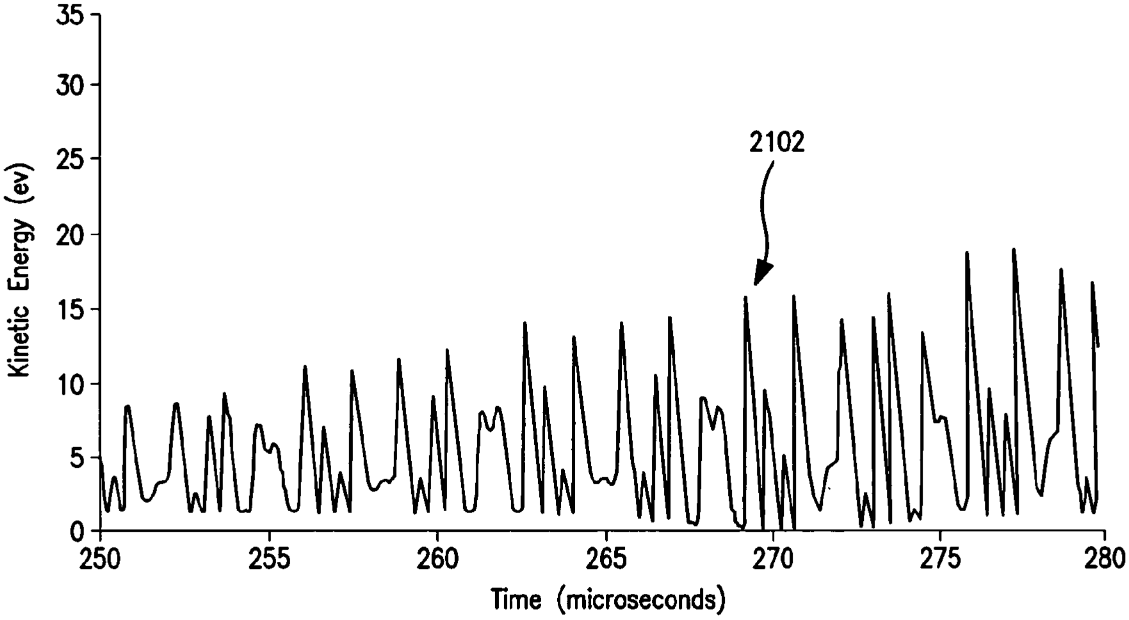
FIG. 21 is a plot of the calculated kinetic energy (in eV) of the ion as a function of time (in μs), illustrating the calculated instantaneous kinetic energy of the ion for the time period shown in FIG. 20.

FIG. 21 is a plot of the calculated kinetic energy (in eV) of the ion as a function of time (in μs), illustrating the calculated instantaneous kinetic energy of the ion for the time period shown in FIG. 20. If a collision occurs with the damping gas at a time when the ion has a large kinetic energy, such as at 2102, the ion will dissociate into smaller fragments if the energy is large enough (i.e., CID will result). It can be seen, however, that the duty cycle for CID is low since the ions have a high kinetic energy for only brief periods during the secular oscillation of the ion, primarily at or near the turning points of the secular oscillation. The efficiency of CID is further reduced due to the time available before the ion is ejected from the ion trap as a result of its increased oscillations as shown in FIG. 18. Hence, efficient CID requires the ion to be in the trap for extended times. It is possible, for a given damping gas pressure, to adjust the CID voltage to exactly balance the increase in the ion oscillation amplitude due to the supplemental resonance RF voltage with the decrease in the amplitude due to the damping effect of the collisions of the ion with the surrounding gas. However, in practice this is difficult. See generally R. E. March, *An Introduction to Quadrupole Ion Trap Mass Spectrometry*, J. MASS SPECTROMETRY, Vol. 32, 351-369 (1997).

In accordance with implementations described below, processes entailing ion excitation such as CID may be improved by setting the amplitude of the voltage applied to the compensation electrode(s) to a value that is different than that used for mass scanning and other procedures entailing deliberate ion ejection. Setting the voltage of the compensation electrodes to a value that is significantly different from that of the trapping field electrodes introduces a large multipole component into the trapping field. The multipole component can be tuned to optimize such processes. Typically, a symmetrical multipole component such as an octopole component is desired for this purpose.

Figure 22:
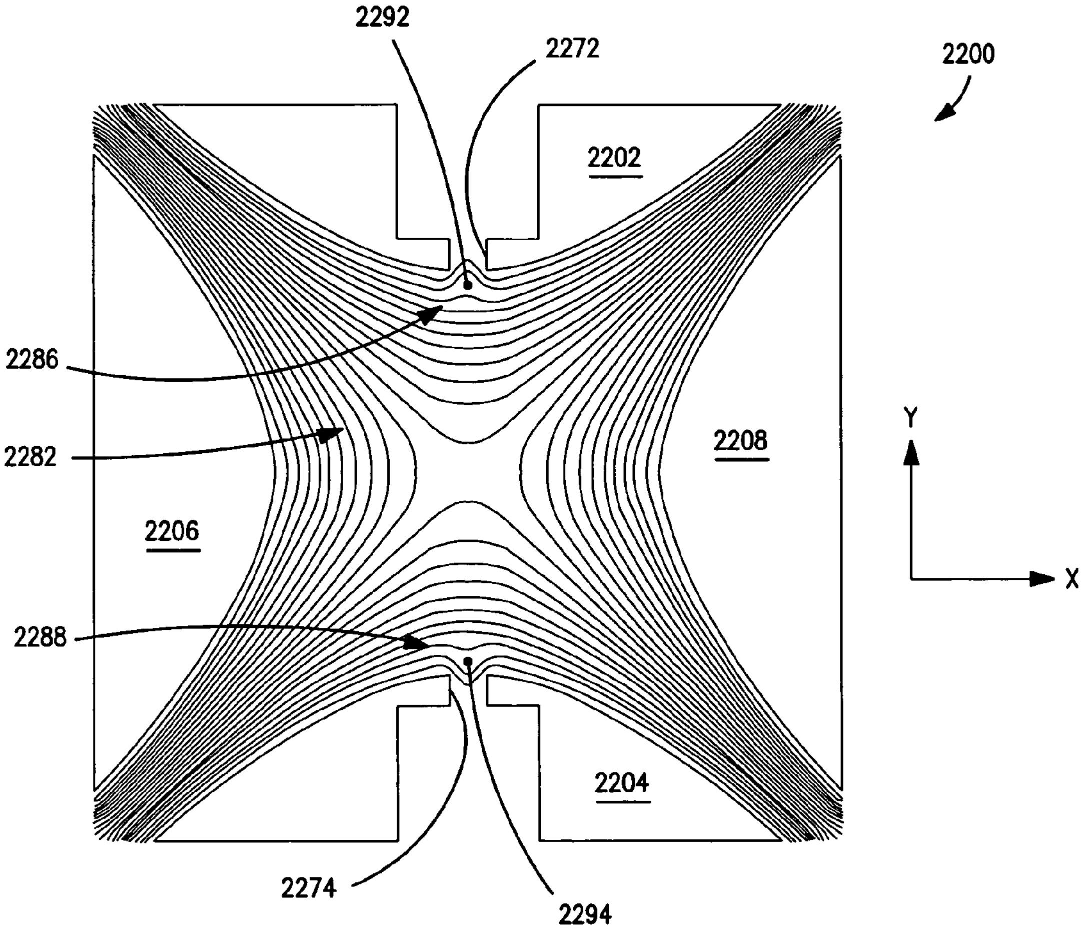
FIG. 22 is a cross-sectional view of an electrode structure similar to that illustrated in FIG. 16, in which the amplitude of the voltage on the compensation electrodes has been set lower than the amplitude of the voltage on the associated trapping electrodes in accordance with implementations described in the present disclosure.

FIG. 22 illustrates an electrode structure 2200 that includes a plurality of trapping electrodes 2202, 2204, 2206 and 2208. The opposing y-axis electrodes 2202 and 2204 have respective apertures 2272 and 2274 and corresponding compensation electrodes 2292 and 2294. The respective voltages applied to trapping electrodes 2202, 2204, 2206 and 2208 and the compensation electrodes 2292 and 2294 produce an RF field that is optimized for ion excitation in conjunction with processes such as CID. Specifically, the voltage on the compensation electrodes 2292 and 2294 is set to a value different from that of the voltage on the associated trapping electrodes 2204 and 2204. In the present example, the amplitude of the voltage on the compensation electrodes 2292 and 2294 has been set to about 70% of the amplitude of the voltage on the associated trapping electrodes 2204 and 2204. As a result, the equipotential lines 2282 shown in FIG. 22 are increasingly separated in the regions 2286 and 2288 adjacent to the respective ion exit apertures 2272 and 2274, where it can be seen that the potential lines are distorted. This is in contrast to the RF field shown in FIG. 16 where the equipotential lines 1682 appear undistorted. Since the electrical field is equal to the gradient of the electrical potential, the increased spacing of the equipotential lines 2282 in FIG. 22 indicates that the electrical field is becoming weakened in these regions 2286 and 2288, similar to the uncompensated configuration illustrated in FIG. 8 and described above.

As previously noted, a damping gas may be introduced in the electrode structure 2200 to thermalize the ions such that the ions accumulate at the center of the trapping field. Additionally, an alternating supplemental excitation potential may be applied to an opposing pair of electrodes (in the present example, the y-electrodes 2202 and 2204) to form a resonant driving field, and the amplitude of the trapping voltage ramped to increase the natural oscillation frequency of the ions in the trapping field. When the natural oscillation frequency matches up with the frequency of the resonant driving field, the ions take up additional energy and their amplitude of oscillation increases along with their kinetic energy as they move outwardly from the center of the trapping volume. As previously noted, the frequency of oscillation of the ions is a function of the force on the ions in the trapping field. This function is nonlinear in the non-ideal RF field generated in the present example. Since the initial position of the ions at the beginning of resonant excitation is near the center of the trapping field, the ions will remain clustered along the y-axis when excited along the y-axis direction as in the present example, and their amplitude of oscillation will increase only along the y-axis. Therefore, small deviations in the ideality of the trapping field along the y-axis can have a significant effect on the ion motion.

It is known that the presence of octopole components in a trapping field improves the efficiency of CID by causing the secular frequency of the ion to shift out of resonance as the amplitude of oscillation of the ion increases. See, e.g., J. Franzen et al., *Practical Aspects of Ion Trap Mass Spectrometry*; March, R. E.; Todd, J. F. J; Editors; CRC Press (1995). In the implementation illustrated in FIG. 22, the reduction in the strength of the electric field (restoring force) near the apertures 2272 and 2274 of the respective electrodes 2202 and 2204 results in the frequency of oscillation being reduced. This causes ions near the apertures 2272 and 2274 to go out of resonance with the resonant driving force on the electrodes 2202 and 2204.

Figure 23:
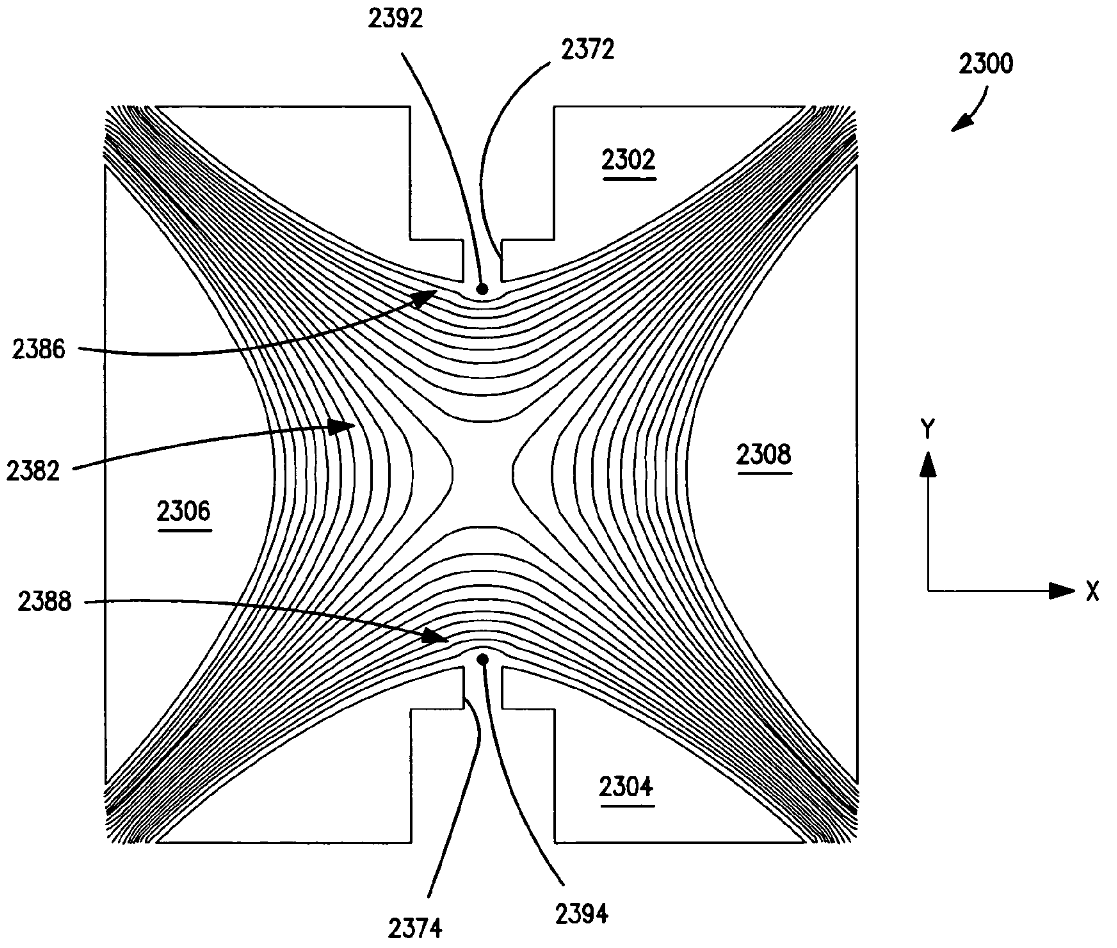
FIG. 23 is a cross-sectional view of an electrode structure similar to that illustrated in FIG. 16, in which the amplitude of the voltage on the compensation electrodes has been set higher than the amplitude of the voltage on the associated trapping electrodes in accordance with implementations described in the present disclosure.

FIG. 23 illustrates another example of setting the voltage on the compensation electrodes 2392 and 2394 to a value different from that of the voltage on the associated trapping electrodes 2302 and 2304. Specifically, FIG. 23 shows the effect on the equipotential lines 2382 when the voltage on the compensation electrodes 2392 and 2394 is set above the voltage of the associated trapping electrodes 2302 and 2304. In this example, the amplitude of the voltage on the compensation electrodes 2392 and 2394 is set to about 130% of the amplitude of the voltage on the associated trapping electrodes 2302 and 2304. It is seen that the equipotential lines 2382 are compressed due to an increase in the restoring force of the trapping field. The effect will be the same as discussed for FIG. 22, in that the ions will begin to move out of resonance at the affected field regions 2386 and 2388 near the respective apertures 2392 and 2394 as the amplitude of ion oscillation increases.

Figure 24:
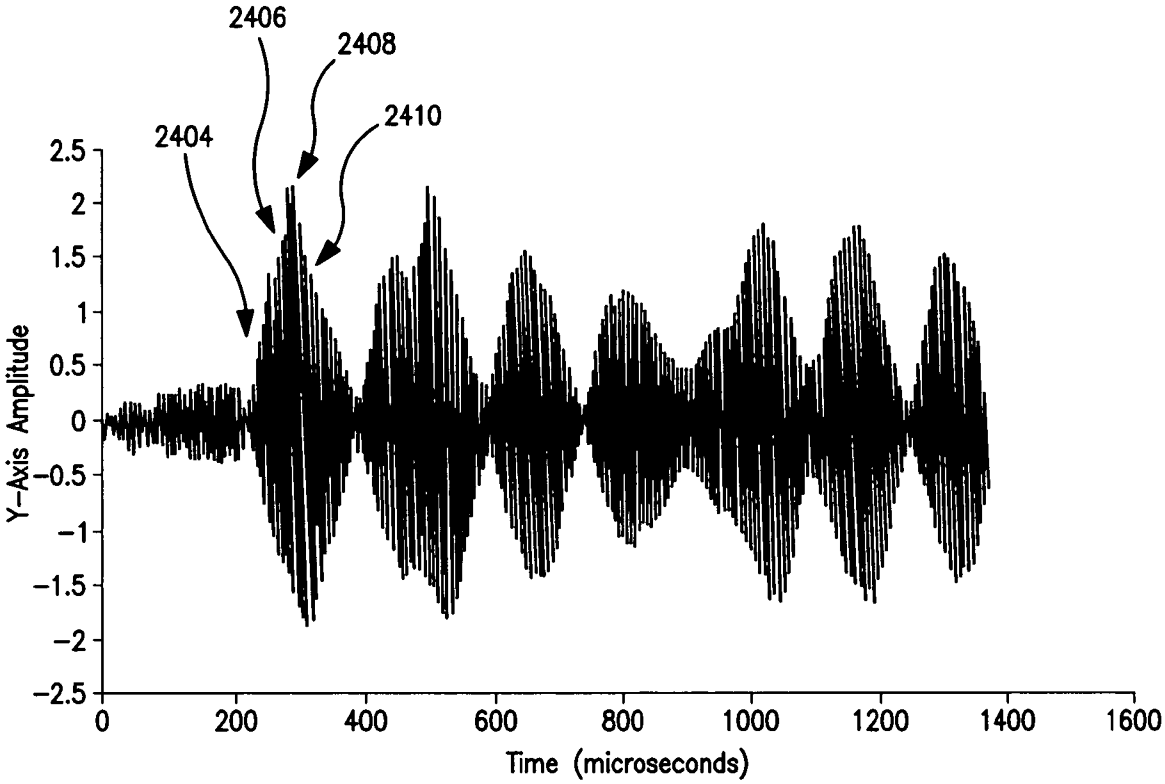
FIG. 24 shows the simulation of an ion motion (in mm) along the y-axis as a function of time (in μs) in a trapping field for the case illustrated in FIG. 22, and including a resonant excitation stage.

FIG. 24 shows the simulation of an ion motion along the y-axis in a trapping field in which the RF voltage on the compensation electrodes 2292 and 2294 is set to a value that is 70% of the voltage on the associated trapping electrodes 2302 and 2304 as in the case of FIG. 22. The m/z ratio of the test ion was 300 and the supplemental resonant frequency was 150 kHz at 1.0 V. The supplemental resonant voltage was turned on at approximately 220 microseconds into the simulation, as generally indicated at 2404.

Figure 25:
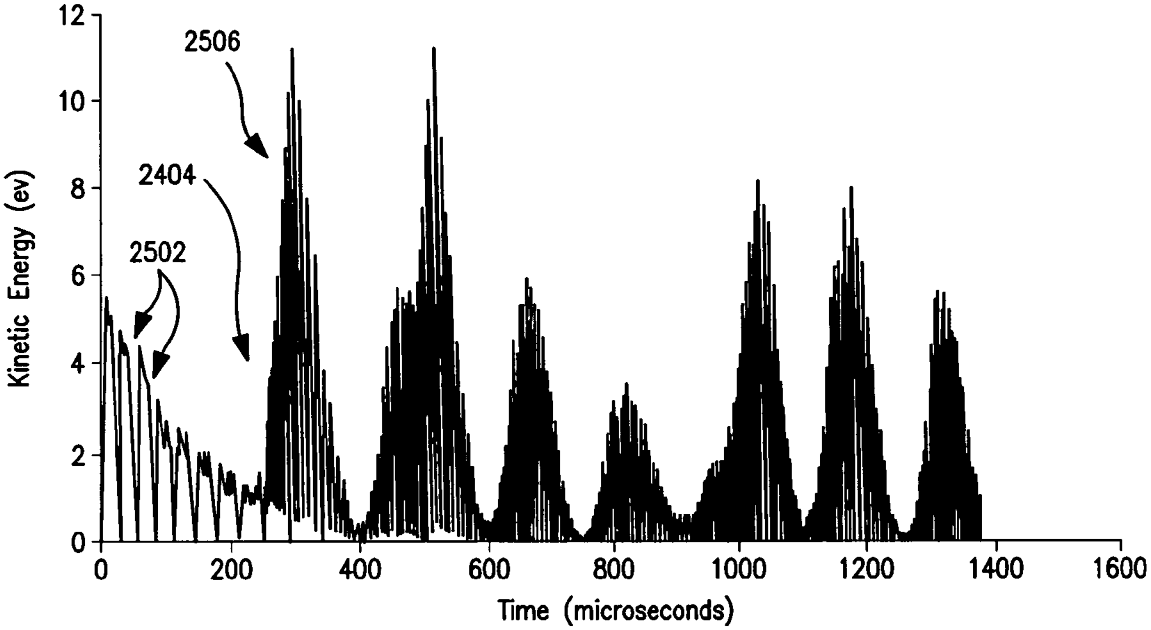
FIG. 25 shows the corresponding kinetic energy (in eV) of the ion as a function of time (in μs) in the simulation of FIG. 24.

FIG. 25 shows the corresponding kinetic energy of the ion as a function of time from the same simulation as FIG. 24. As is the case of FIG. 19, the initial kinetic energy of the ion entering along the central axis of the ion trap and oscillating in the transverse direction is progressively reduced due to collisions with the damping gas. Additionally, the energy is almost zero at the turning points 2502 at the radial (y-axis) ends of the ion trap. After the supplemental resonant voltage is turned on at approximately 220 microseconds into the simulation, as generally indicated at 2404, the amplitude and kinetic energy of the ion initially increase with time as generally indicated at 2406 in FIG. 24 and at 2506 in FIG. 25, respectively. However, when the amplitude of ion oscillation is increased to a maximum of approximately 2 mm, as generally indicated at 2408 in FIG. 24, the ion shifts out of resonance with the supplemental field and the field begins to actively decrease the amplitude of oscillation of the ion as generally indicated at 2410 in FIG. 24. The decrease the amplitude of oscillation of the ion occurs because the change in the secular frequency of oscillation of the ion also introduces a time delay between the supplemental field frequency and the new secular frequency of the ion, which is equivalent to a phase shift such that the supplemental field is decreasing the ion oscillation.

In some implementations described in the present disclosure, the voltages on one or more compensation electrodes may be adjusted so as to optimize an associated ion processing apparatus for one mode of operation such as ion ejection, and subsequently to optimize the apparatus for another mode of operation such as CID. Adjusting for different modes of operation is also described in a co-pending U.S. patent application titled "Adjusting Field Conditions in Linear Ion Processing Apparatus for Different Modes of Operation," commonly assigned to the assignee of the present disclosure. The use of compensation electrodes to optimize field conditions for processes such as CID is also described in a co-pending U.S. patent application titled "Improved Field Conditions for Ion Excitation in Linear Processing Apparatus," commonly assigned to the assignee of the present disclosure.

According to other implementations, the CID process and other ion excitation processes may be further improved by performing a technique that may be referred as rotating-field ion excitation or, in the specific case of CID, rotating-field CID. In accordance with this technique, and referring back to FIG. 17 as an example, an appropriate trapping voltage is applied to the main or trapping electrodes 1702, 1704, 1706 and 1708. As previously described, the application of the trapping voltage may involve the application of more than one RF signal. For example, to generate a typical quadrupolar trapping field, an RF signal may be applied to the y-axis electrodes 1702 and 1704 and another RF signal 1800 out of phase with the first RF signal may be applied to the x-axis electrodes 1706 and 1708. A trapping voltage is also applied to the compensating electrodes 1792, 1794, 1796 and 1798. As previously described, the amplitude of the trapping voltage applied to the compensating electrodes 1792, 1794, 1796 and 1798 is proportional to the trapping voltage applied to the associated trapping electrodes 1702, 1704, 1706 and 1708. That is, the amplitude of the trapping voltage applied to the compensating electrodes 1792, 1794, 1796 and 1798 may be adjusted to be equal to or different from the amplitude of the trapping voltage on the trapping electrodes 1702, 1704, 1706 and 1708. An alternating supplemental excitation voltage is applied to one set of opposing trapping electrodes 1702 and 1704 and their respective compensation electrodes 1792 and 1794 (e.g., those oriented in the y-axis). A second alternating supplemental excitation voltage is applied to the other set of opposing trapping electrodes 1706 and 1708 and their respective compensation electrodes 1796 and 1798 (e.g., those oriented in the x-axis). The second supplemental voltage is applied at the same frequency as the first supplemental voltage, but in phase quadrature (90° out of phase). The supplemental frequency is selected to match the secular frequency of an ion of a specific m/z ratio confined in the center of the trapping field. The trapping voltage on the compensation electrodes 1792, 1794, 1796 and 1798 may be adjusted be different from the trapping voltage on their respective trapping electrodes 1702, 1704, 1706 and 1708, so as to induce a large octopole component in the trapping field. An alternative embodiment would have only one set of opposing compensation electrodes 1792, 1794 or 1796, 1798 present. The advantages of this technique are described below with reference to FIGS. 26-33.

An experiment in which a perfectly compensated trapping field is employed will first be considered which, as described above, is considered optimal for ion ejection but not optimal for CID and other processes require time for execution without ion ejection or prior to ion ejection. FIG. 17 shows the equipotential lines 1782 for the perfectly compensated trapping field (i.e., no significant octopole exists in the field).

Figure 26:
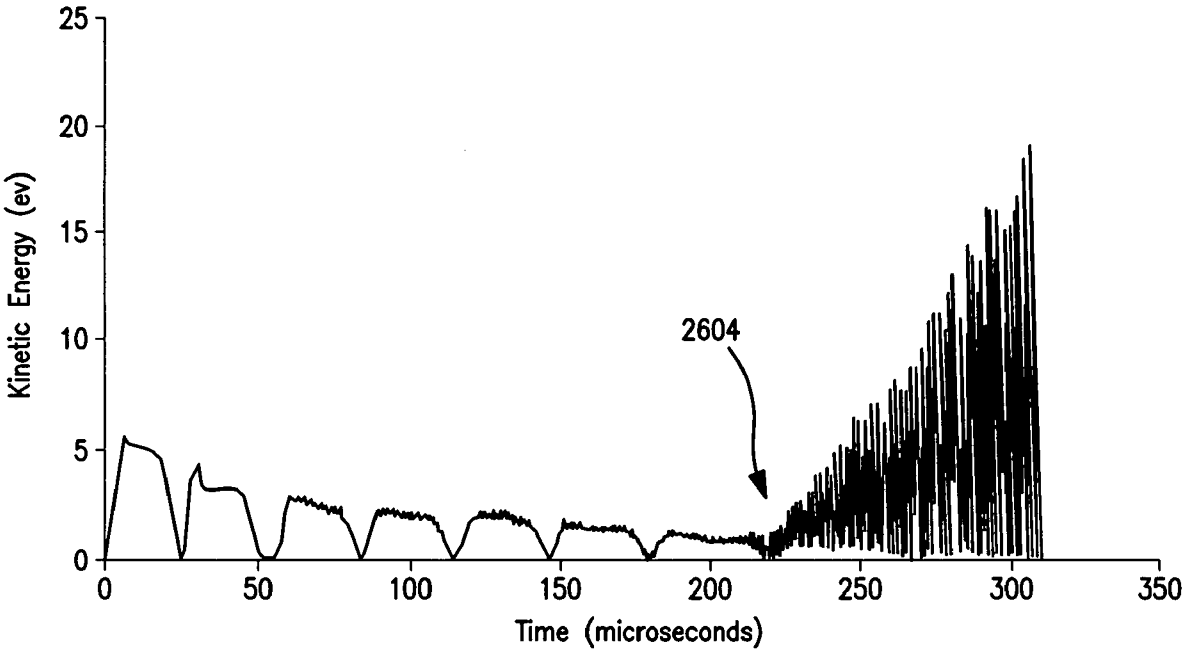
FIG. 26 shows a simulation of ion motion in perfectly compensated trapping field (i.e., no significant octopole), including a resonant excitation stage, and in which the y-axis kinetic energy (in eV) is plotted as a function of time (in μs).
Figure 27:
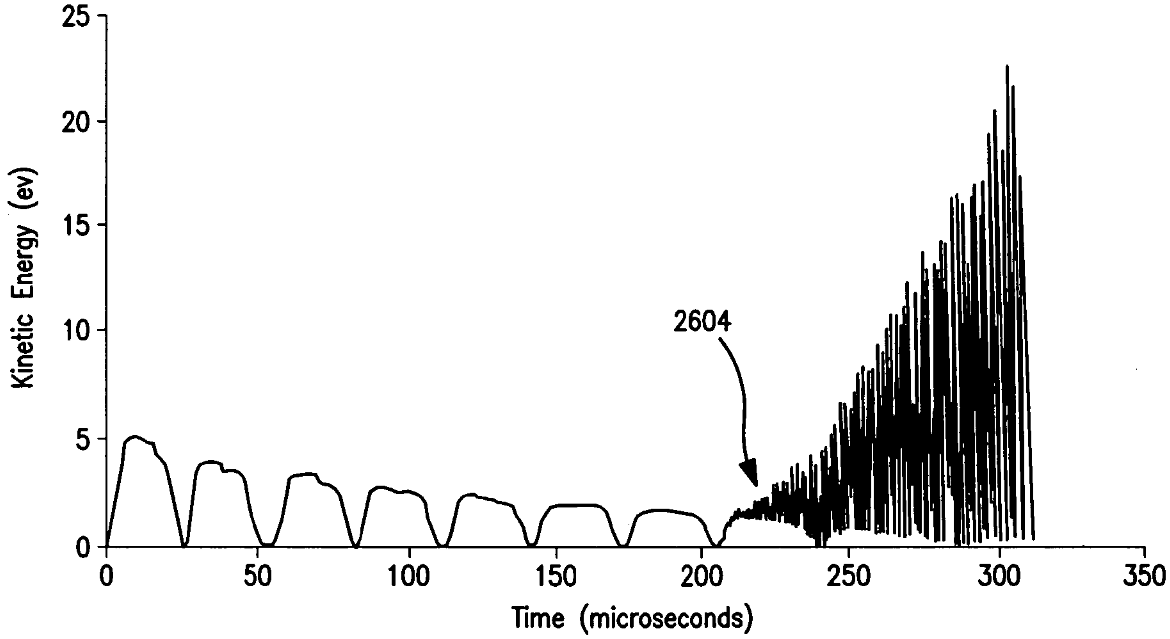
FIG. 27 shows another simulation for the same conditions as in FIG. 26, in which the x-axis kinetic energy (in eV) plotted as a function of time (in μs).
Figure 28:
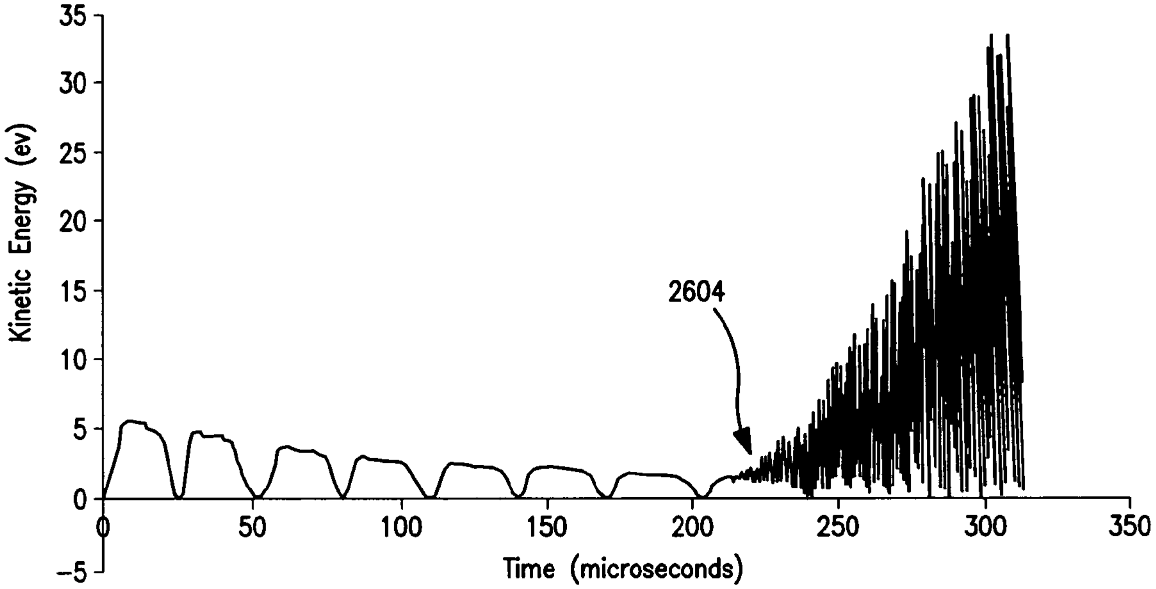
FIG. 28 shows another simulation for the same conditions as in FIGS. 26 and 27, and illustrating the xy-axis total kinetic energy effect of having two supplemental resonant fields operating in phase quadrature.

FIG. 26 shows the simulation of the ion motion in a perfectly compensated trapping field (i.e., no octopole). The y-axis kinetic energy is plotted as a function of time. A supplemental resonant voltage of 0.3-V magnitude was turned on at approximately 220 microseconds into the simulation, as generally indicated at 2604. FIG. 27 shows a second simulation under the same conditions but for the x-axis kinetic energy. FIG. 28 shows the xy-axis total kinetic energy effect of having two supplemental resonant fields operating in phase quadrature. FIGS. 26-28 show that the kinetic energy of the ion can be increased by applying two supplemental fields.

Figure 29:
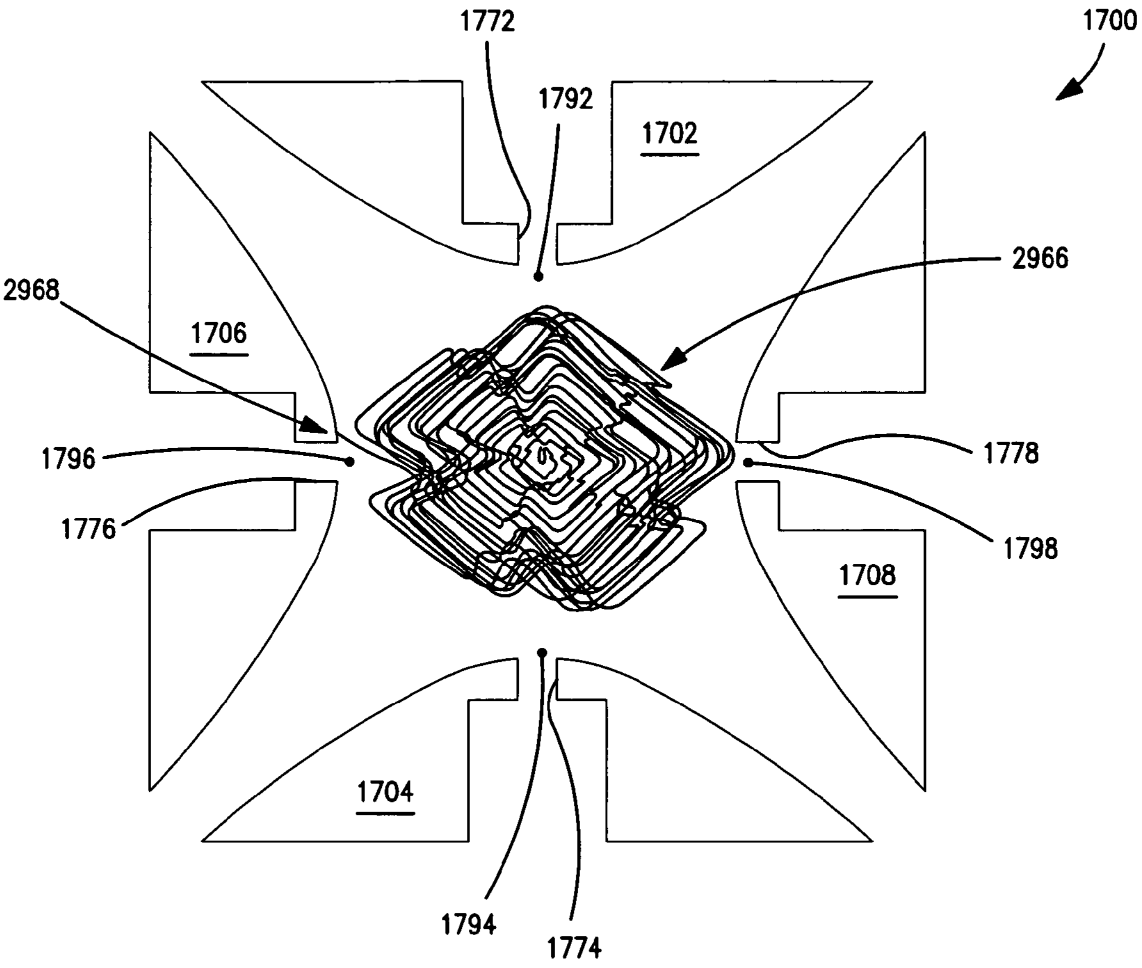
FIG. 29 is a cross-sectional view of an electrode structure similar to that illustrated in FIG. 17, illustrating the trajectory of ion motion in the x-y plane in response to two orthogonal supplemental resonant fields operating in phase quadrature in accordance with implementations described in the present disclosure, under conditions approximating an ideal trapping field.

Continuing with the present example in which a perfectly compensated trapping field (or, at least, a trapping field containing no significant octopole component) is applied and two mutually orthogonal supplemental resonant fields operating in phase quadrature and at 0.3 V are applied, FIG. 29 shows the trajectory 2966 of the ion motion in the xy plane of the electrode structure 1700 described above in conjunction with FIG. 17. Two effects are observed: First, the ion circulates about the central axis of the trapping field due to the rotating supplemental resonant field. Second, absent the octopole component in the field, amplitude of the motion of the ion increases until the ion strikes one of the trapping electrodes as indicated at 2968.

Figure 30:
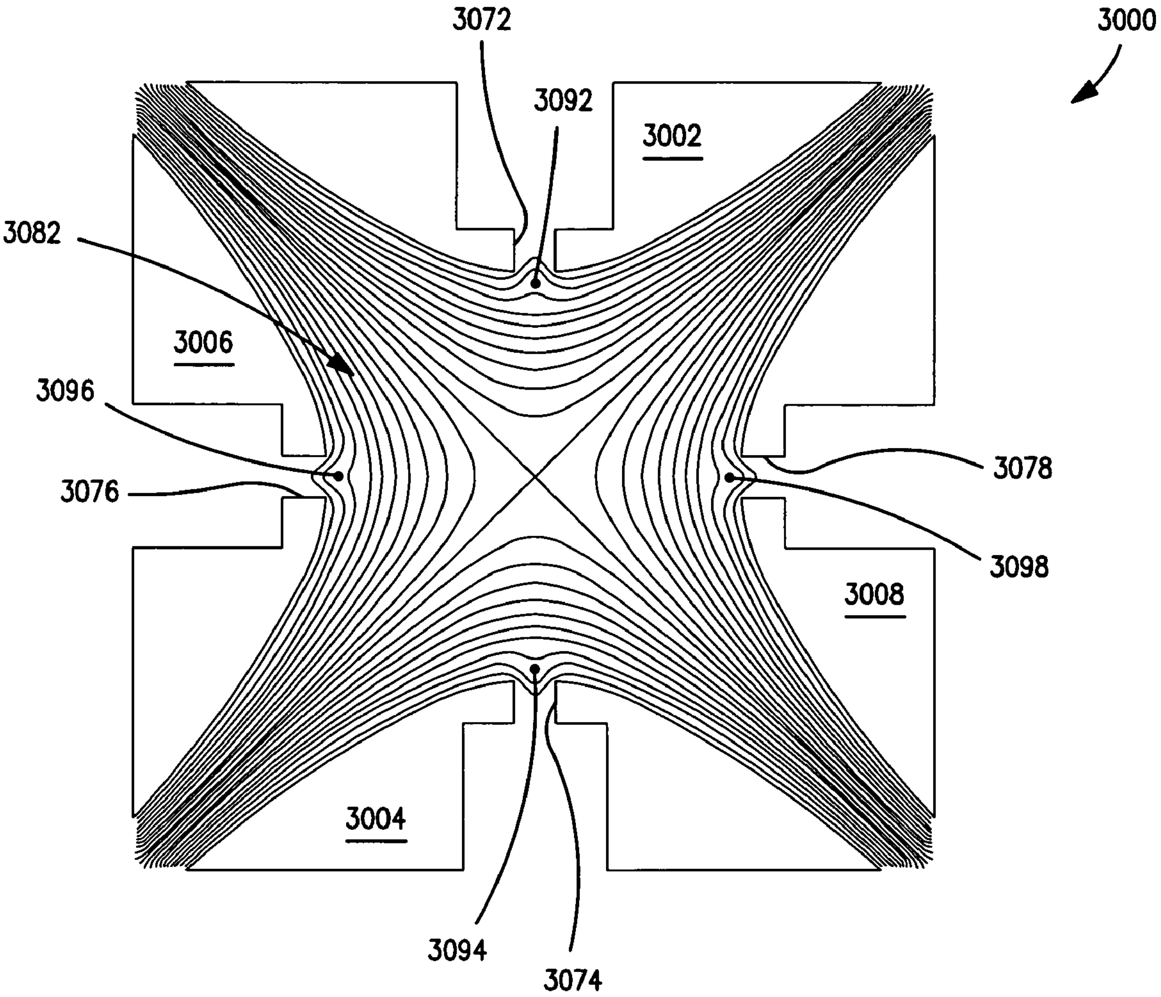
FIG. 30 is a cross-sectional view of an electrode structure similar to that illustrated in FIG. 17, in which the amplitude of the voltage on the compensation electrodes has been set lower than the amplitude of the voltage on the associated trapping electrodes in accordance with implementations described in the present disclosure.
Figure 31:
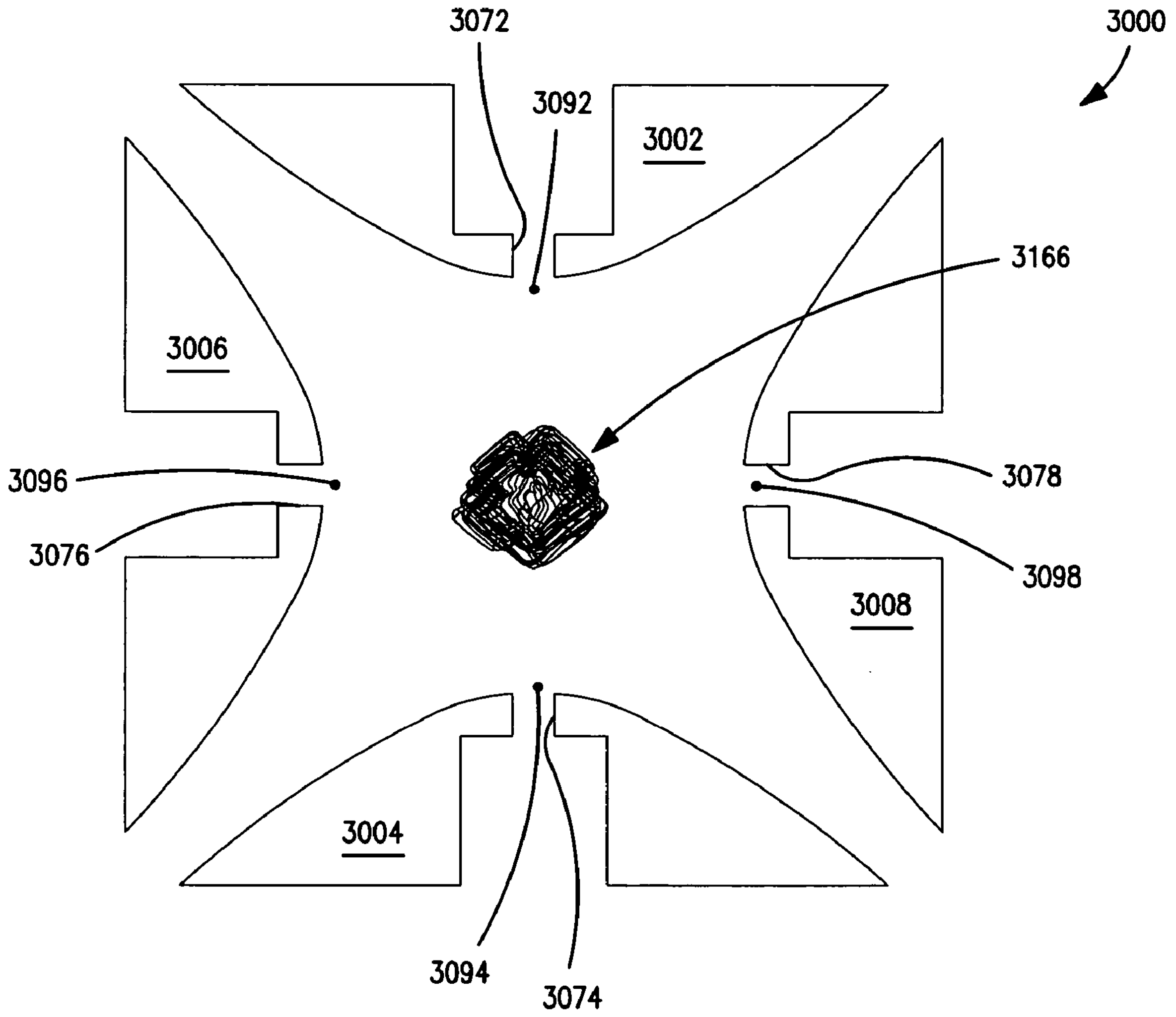
FIG. 31 shows the same simulation as in FIG. 29 under identical conditions, except the compensation electrodes have been set to a voltage that is lower than the amplitude of the voltage on the associated trapping electrodes as in the case of FIG. 30, and the amplitude of the supplemental voltage has been increased.

By comparison, FIG. 30 illustrates an electrode structure 3000 that includes a set of trapping electrodes 3002, 3004, 3006 and 3008, and corresponding compensation electrodes 3092, 3094, 3096 and 3098 positioned proximate to corresponding apertures 3072, 3074, 3076 and 3078. FIG. 30 shows the equipotential lines 3082 for the trapping field with the compensation electrodes 3092, 3094, 3096 and 3098 at a potential that is 70% of the associated trapping electrodes 3002, 3004, 3006 and 3008. FIG. 31 shows the same simulation as in FIG. 29 under identical conditions, except the compensation electrodes 3092, 3094, 3096 and 3098 have been set to a voltage that is 70% of the associated voltage on the trapping electrodes 3002, 3004, 3006 and 3008 and the supplemental voltage has been increased to 0.8 V. As a result, the ion does not spiral outward and strike a trapping electrode 3002, 3004, 3006 or 3008, but rather it is confined to a small region about the central axis as indicated by the ion trajectory 3166 shown in FIG. 31.

Figure 32:
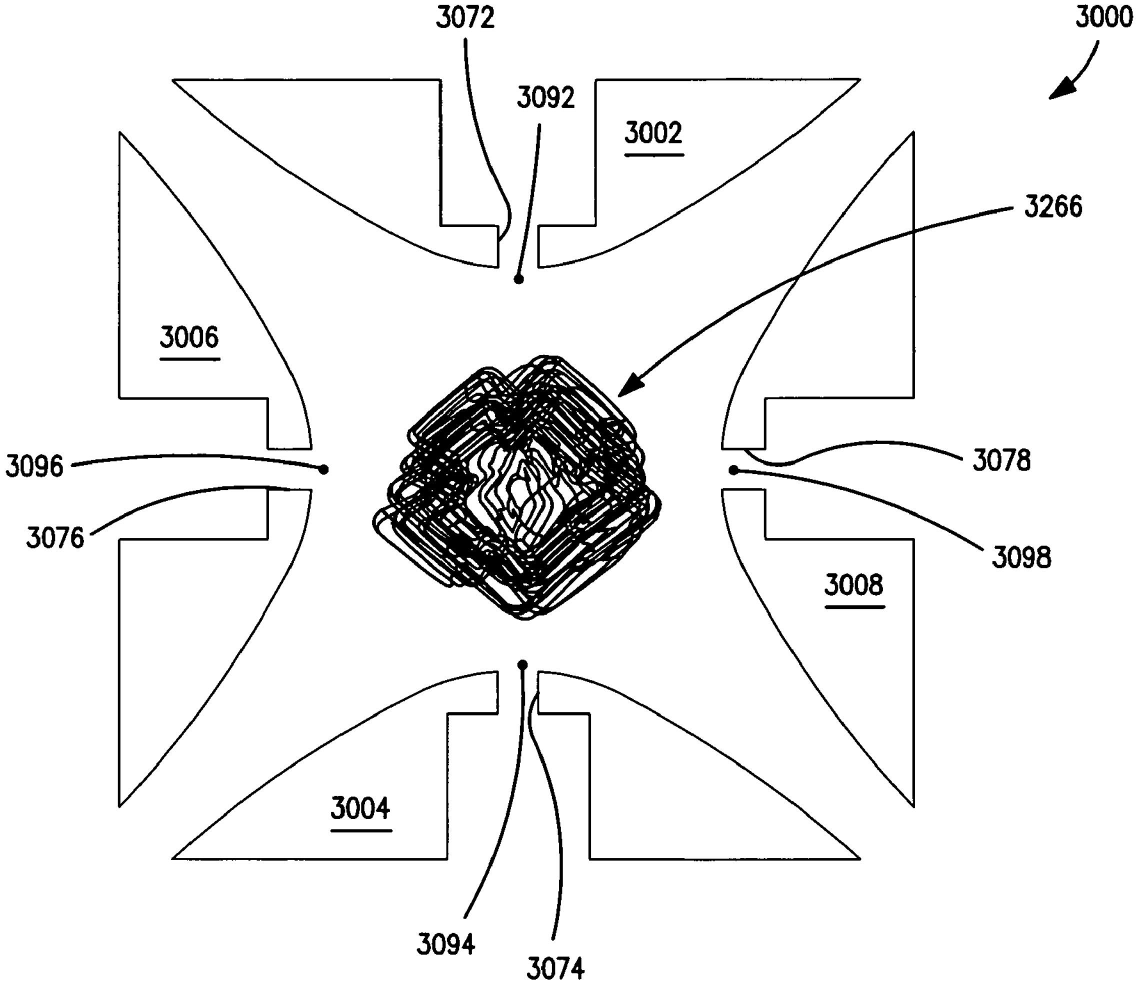
FIG. 32 shows the same simulation as in FIG. 31 under identical conditions, except the compensation electrodes have been set to a voltage that lower than the amplitude of the voltage on the associated trapping electrodes as in the case of FIG. 30, but higher than in the case of FIG. 31.
Figure 33:
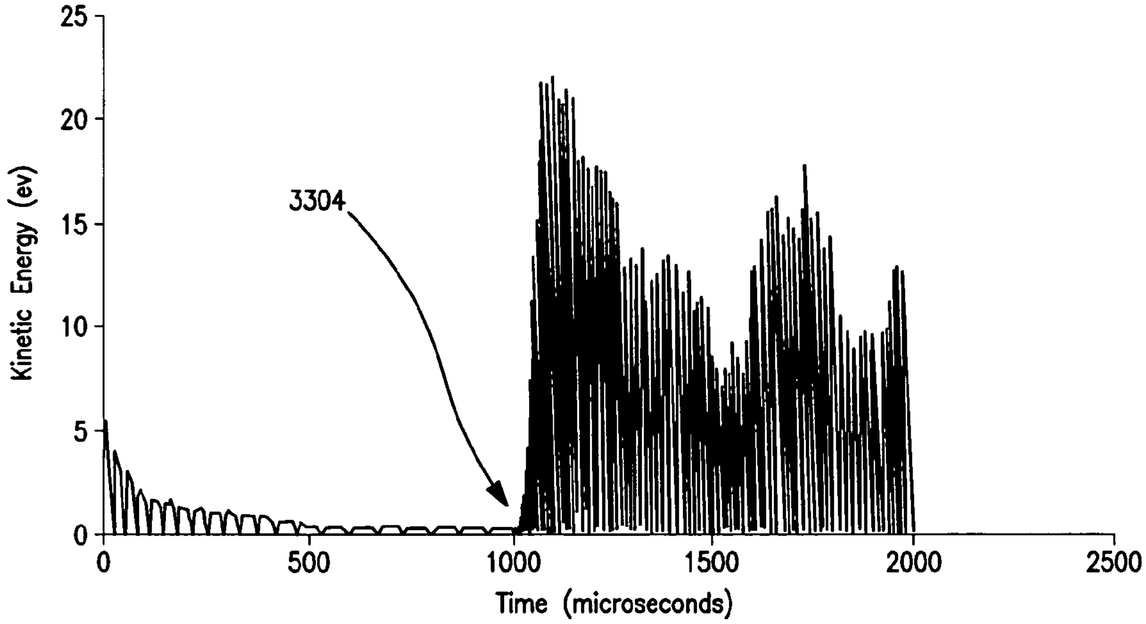
FIG. 33 shows the corresponding kinetic energy (in eV) of the ion as a function of time (in μs) in the conditions of FIG. 32.

FIG. 32 is identical to the conditions for FIG. 31 except that the compensation electrodes 3092, 3094, 3096 and 3098 have been set to 90% of the associated voltage on the trapping electrodes 3002, 3004, 3006 and 3008, resulting in the ion trajectory indicated at 3266. FIG. 33 plots the calculated kinetic energy for the conditions in FIG. 32, with the supplemental resonant field applied at a point in time generally indicated at 3304. It was further observed that the amplitude of the supplemental resonant frequency could be adjusted over a large range without the ions spiraling out and striking a trapping electrode 3002, 3004, 3006 or 3008. This is because a larger amplitude supplemental voltage will cause the ion amplitude to grow faster and thus the ion will shift out of resonance faster, thereby retarding the growth of the amplitude of oscillation of the ion.

Figure 34:
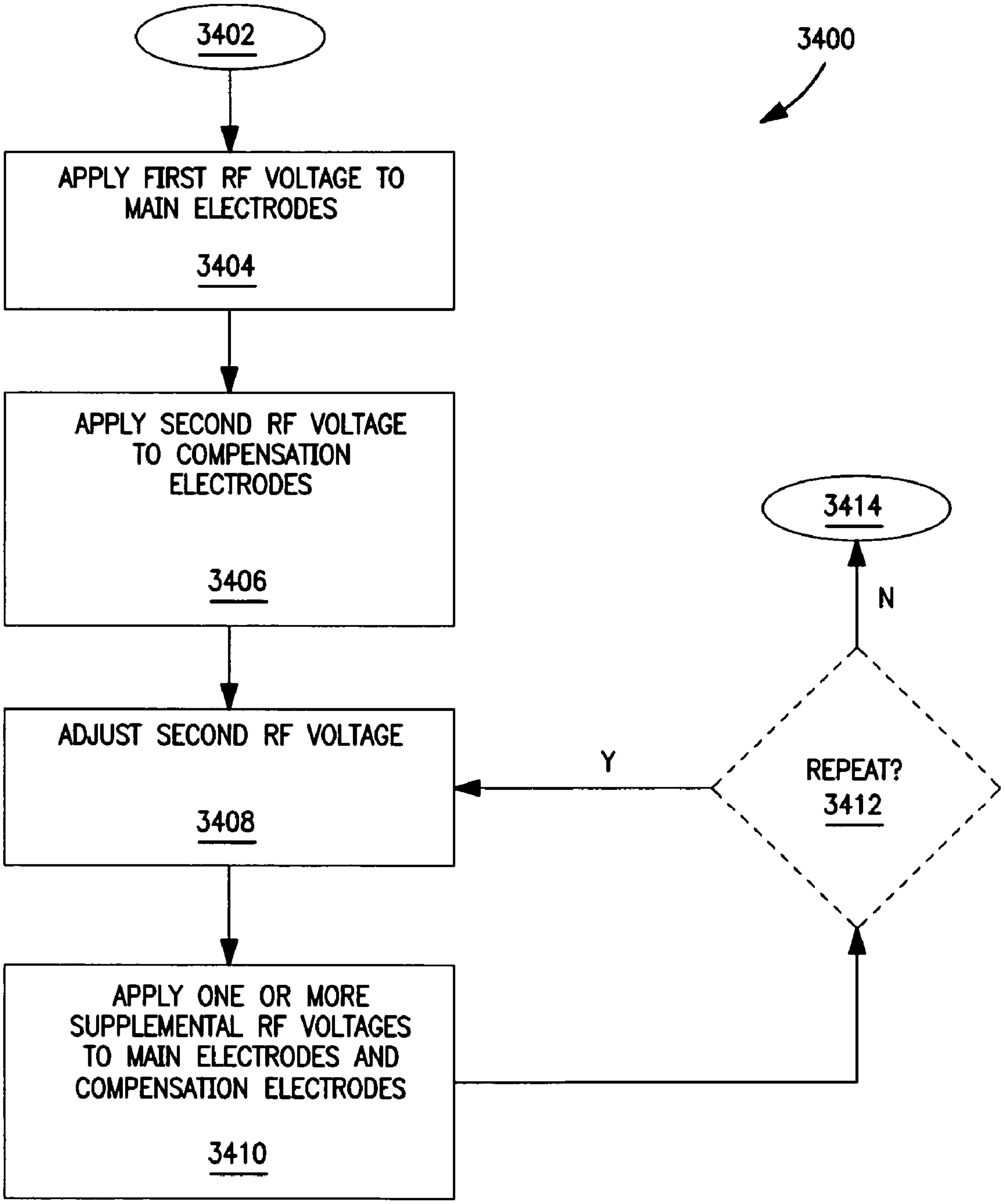
FIG. 34 is a flow diagram illustrating methods in accordance with implementations described in the present disclosure.

FIG. 34 is a flow diagram 3400 illustrating examples of methods for applying an RF in an electrode structure of linear geometry such as any of the electrode structures described above, and for adjusting the RF field to meet desired conditions. The flow diagram 3400 may also represent an apparatus capable of performing the method. The method begins at 3402, where any suitable preliminary steps may be taken, such as providing ions in the electrode structure, eliminating ions of no analytical value, pre-scanning, isolating a precursor ion, introducing a gas, and the like. At block 3404, a first RF voltage is applied to one or more of the main electrodes as needed to generate an RF field having a desired spatial form and function. For example, the first RF voltage may be utilized to form a symmetrical trapping field for constraining the motion of ions along two axes. At block 3406, a second RF voltage is applied to one or more compensation electrodes of the electrode structure to modify the RF field as needed. For example, the RF field may be modified to optimize the RF field for ion ejection, CID, or other modes of operation. The process ends at 3414, where any suitable succeeding steps may be taken, such as mass-scanning, generating a mass spectrum, and the like.

Optionally, as indicated at block 3408, the second RF voltage may be adjusted to alter the conditions of the RF field that resulted from initial application of the first and second RF voltages, such as by adding a multipole component to the RF field or changing the strength of a multipole component already existing in the RF field. As described above, this adjustment may be useful in switching between two different modes of operation such as ion ejection and CID. As described above, the second RF voltage is proportional to the first RF voltage. That is, the second RF voltage may be initially applied or subsequently adjusted such that its amplitude is equal to, substantially equal to, greater than (e.g., 110%, 130%), or less than (e.g., 70%, 90%) the amplitude of the first RF voltage. Generally, the amplitude of the second RF voltage may range between about 70 to about 130% of the amplitude of the first RF voltage for typical modes of operation, or from about 0-30% greater or less than the amplitude of the first RF voltage.

As another option, as indicated at block 3410, one or more supplemental RF voltages may be applied to one or more pairs of main electrodes and one or more pairs of compensation electrodes. For example, if the second RF voltage has been applied to optimize for CID at block 3406 or the second RF voltage has been adjusted to optimize for CID at block 3408, the supplemental RF voltage(s) may be applied to produce one or more resonant dipoles for effecting CID. Two supplemental RF voltages may be applied to form a circularly polarized RF field for this purpose. As another example, if the second RF voltage is applied or adjusted to optimize for ion ejection, a supplemental RF voltage may be applied to cause rapid ejection of ions of a selected mass or mass range. As another option, as indicated at block 3412, a determination may be made as to whether to repeat steps 3408 and 3410, which may be useful, for example, for making additional changes to the RF field to execute additional modes of operation. Depending on the outcome of this determination, the process either returns to block 3408, or ends at 3414 where any suitable succeeding steps may be taken, such as mass scanning, generating a mass spectrum, and the like.

Figure 35:
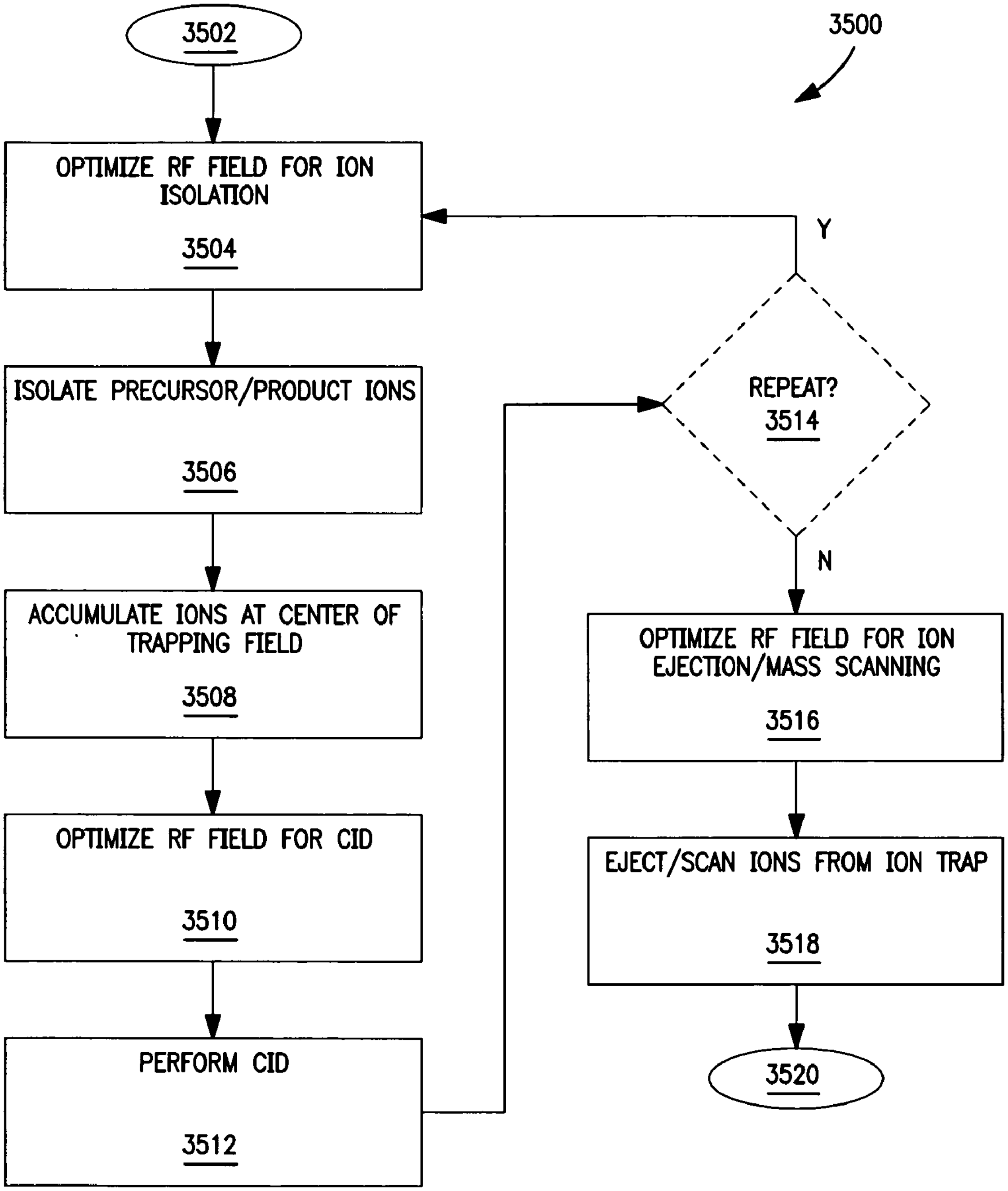
FIG. 35 is a flow diagram illustrating methods in accordance with other implementations described in the present disclosure.

FIG. 35 is a flow diagram 3500 illustrating examples of methods for applying an RF in an electrode structure such as a linear ion trap and for optimizing the RF field to meet desired conditions, particularly for ejecting ions during a given stage of operation and dissociating ions during another stage of operation. The electrode structures described above may operate as or be a part of such a linear ion trap. The flow diagram 3500 may also represent a linear electrode structure or linear ion trap apparatus capable of performing the method. The method begins at 3502, where any suitable preliminary steps may be taken, such as providing ions in the electrode structure, eliminating ions of no analytical value, pre-scanning, introducing a gas, applying an RF trapping field, and the like. In one aspect of this method, the product ion is isolated prior to effecting CID. Accordingly, at block 3504, the RF field is first optimized for ion isolation, such as by setting the RF voltage on the compensation electrodes to appropriate parameters appropriate for ejecting ions of undesired masses. At block 3506, one or more precursor ions are isolated, such as by applying a resonant dipole at an appropriate frequency or mixture of frequencies, ramping the RF trapping voltage, or the like. At block 3508, the precursor ions are accumulated at the center of the ion trap as a result of applying the RF trapping field and typically with the assistance of damping collisions with a suitable gas. At block 3510, the RF field is optimized for CID, such as by setting the RF voltage on the compensation electrodes to appropriate parameters. At block 3512, CID is performed to dissociate the precursor ions into product ions, such as by applying one or more supplemental RF voltages. At block 3516, the RF field may be optimized for ion ejection in a manner described above. Next, at block 3518, the ions may be ejected from the ion trap. The ejection may be carried out on a mass-dependent basis to provide data for generating a mass spectrum. The process ends at 3520, where any suitable succeeding steps may be taken, such as generating a mass spectrum and the like. Optionally, as indicated at 3514, after the CID step 3512 a determination may be made as to whether to repeat the isolation step 3506 to isolate a remaining precursor ion or a product ion in preparation for another iteration of CID to produce one or more successive generations of product ions. Depending on the outcome of this determination, the process either returns to block 3504 or proceeds to block 3516.

Figure 36:
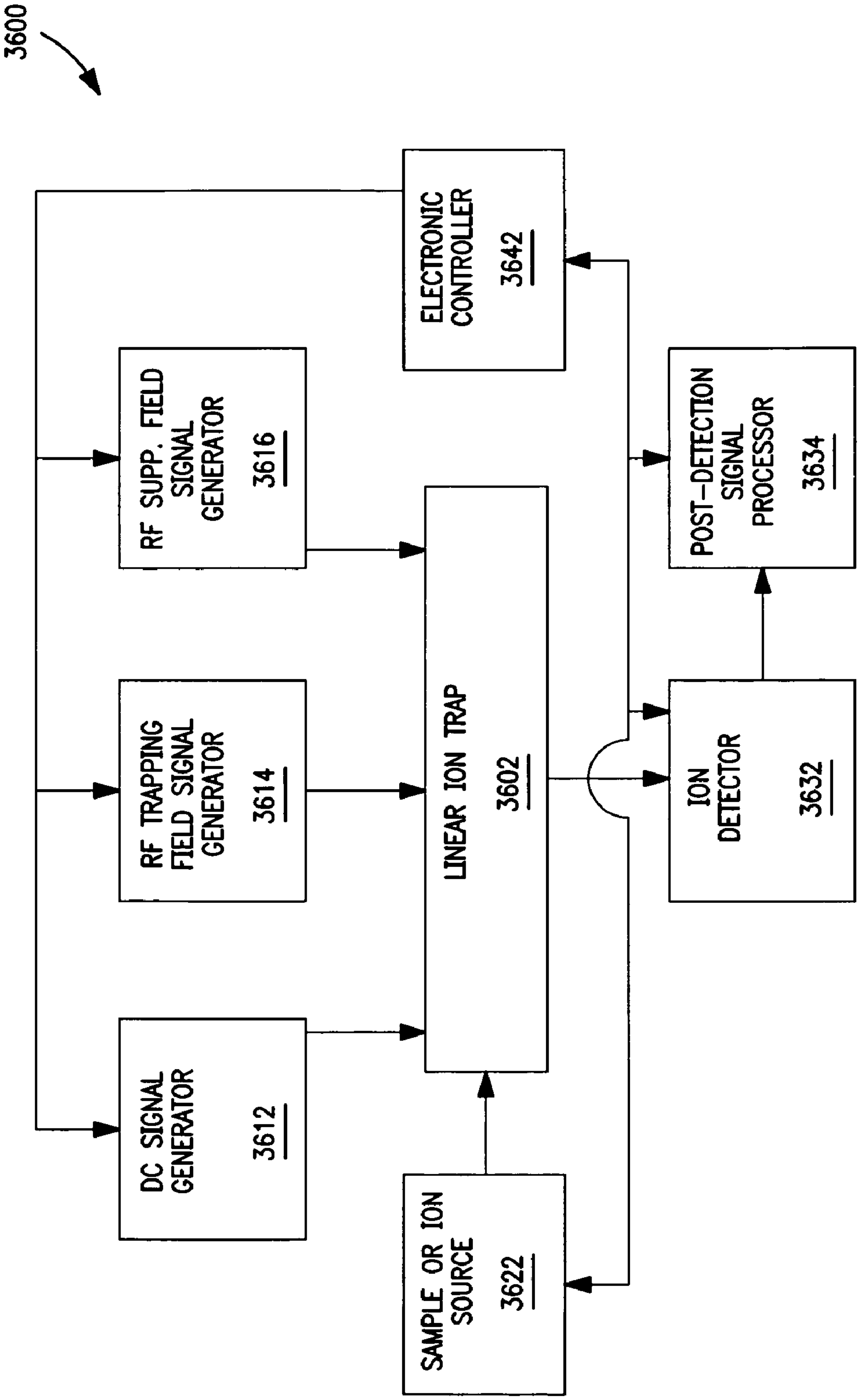
FIG. 36 is a schematic diagram of a mass spectrometry system.

FIG. 36 is a highly generalized and simplified schematic diagram of an example of a linear ion trap-based mass spectrometry (MS) system 3600. The MS system 3600 illustrated in FIG. 36 is but one example of an environment in which implementations described in the present disclosure are applicable. Apart from their utilization in implementations described in the present disclosure, the various components or functions depicted in FIG. 36 are generally known and thus require only brief summarization.

The MS system 3600 includes a linear or two-dimensional ion trap 3602 that may include a multi-electrode structure configured similarly to one of the electrode structures and associated components and features described above. At least one of the electrodes of the ion trap 3602 may be configured as one of the main electrodes 400 described above and illustrated in FIGS. 4-7 and, further, the ion trap 3602 may include at least one compensation electrode 490. The electrode structure of the ion trap 3502 may also be configured as a multi-apertured electrode structure as illustrated for example in FIGS. 16 and 17.

A variety of DC and AC (RF) voltage sources may operatively communicate with the various conductive components of the ion trap 3602 as described above. These voltage sources may include a DC signal generator 3612, an RF trapping field signal generator 3614, and an RF supplemental field signal generator 3616. More than one type of voltage source or signal generator may be provided as needed to operate the compensation electrode(s) 490 in a desired manner, or for other reasons. A sample or ion source 3622 may be interfaced with the ion trap 3602 for introducing sample material to be ionized in the case of internal ionization or introducing ions in the case of external ionization. One or more gas sources 242 (FIG. 2) may communicate with the ion trap 3602 as previously noted. The ion trap 3602 may communicate with one or more ion detectors 3632 for detecting ejected ions for mass analysis. The ion detector 3632 may communicate with a post-detection signal processor 3634 for receiving output signals from the ion detector 3632. The post-detection signal processor 3634 may represent a variety of circuitry and components for carrying out signal-processing functions such as amplification, summation, storage, and the like as needed for acquiring output data and generating mass spectra. As illustrated by signal lines in FIG. 36, the various components and functional entities of the MS system 3600 may communicate with and be controlled by any suitable electronic controller 3642. The electronic controller 3642 may represent one or more computing or electronic-processing devices, and may include both hardware and software attributes. As examples, the electronic controller 3642 may control the operating parameters and timing of the voltages supplied to the ion trap 3602, including the compensation electrode(s) 490 in some implementations, by the DC signal generator 3612, the RF trapping field signal generator 3614, and the RF supplemental field signal generator 3616. In addition, the electronic controller 3642 may execute or control, in whole or in part, one or more steps of the methods described in the present disclosure.

It will be understood that the methods and apparatus described in the present disclosure may be implemented in an MS system 3600 as generally described above and illustrated in FIG. 36 by way of example. The present subject matter, however, is not limited to the specific MS system 3600 illustrated in FIG. 36 or to the specific arrangement of circuitry and components illustrated in FIG. 36. Moreover, the present subject matter is not limited to MS-based applications.

The subject matter described in the present disclosure may also find application to ion traps that operate based on Fourier transform ion cyclotron resonance (FT-ICR), which employ a magnetic field to trap ions and an electric field to eject ions from the trap (or ion cyclotron cell). The subject matter may also find application to static electric traps such as described in U.S. Pat. No. 5,886,346. Apparatus and methods for implementing these ion trapping and mass spectrometric techniques are well-known to persons skilled in the art and therefore need not be described in any further detail herein.

It will be further understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for forming a circularly polarized RF field in an electrode structure, the electrode structure including a plurality of main electrodes coaxially disposed about a central axis and extending generally in the direction of the central axis, the main electrodes defining an interior space extending along the central axis, the method comprising:

applying a first RF voltage to at least two of the main electrodes;

applying a second RF voltage to a compensation electrode disposed in the interior space proximate to a corresponding main electrode at a radial distance from the central axis less than the radial distance of the corresponding main electrode from the central axis;

applying a third RF voltage between first and second main electrodes spaced apart along a first axis orthogonal to the central axis; and applying a fourth RF voltage, in phase quadrature with the third RF voltage, between third and fourth main electrodes spaced apart along a second axis orthogonal to the central axis.

2. The method of claim 1, comprising superposing a multipole component on an ion trapping field generated in the interior space.

3. The method of claim 1, wherein applying the first RF voltage includes applying the first RF voltage at a first amplitude and applying the second RF voltage includes applying the second RF voltage at a second amplitude different from the first amplitude.

4. The method of claim 3, wherein the second amplitude is less than the first amplitude.

5. The method of claim 3, wherein the second amplitude is greater than the first amplitude.

6. The method of claim 3, wherein the second amplitude is in a range of about 70-130% of the first amplitude.

7. The method of claim 1, wherein applying the first RF voltage includes applying the first RF voltage at a first amplitude and applying the second RF voltage includes applying the second RF voltage at a second amplitude substantially equal to the first amplitude.

8. The method of claim 7 comprising, before applying the third and fourth RF voltages, adjusting the second amplitude to a value different from the value of the first amplitude.

9. The method of claim 8 comprising, before applying the third and fourth RF voltages and adjusting the second amplitude, ejecting an ion from the interior space.

10. The method of claim 9 comprising, after adjusting, causing a selected ion in the interior space to undergo collision-induced dissociation.

11. The method of claim 1, wherein the electrode structure includes a plurality of compensation electrodes, and applying the second RF voltage includes applying the second RF voltage to at least two of the compensation electrodes.

12. The method of claim 1, wherein:

the at least two main electrodes are first and second main electrodes, and the plurality of main electrodes further includes a third main electrode and a fourth main electrode;

the electrode structure comprises a first compensation electrode, a second compensation electrode, a third compensation electrode and a fourth compensation electrode;

applying the first RF voltage further comprises applying the first RF voltage to the third and fourth main electrodes at a polarity opposite to the polarity applied to the first and second main electrodes; and applying the second RF voltage comprises applying the second RF voltage to the first and second compensation electrodes, and to the third and fourth compensation electrodes at a polarity opposite to the polarity applied to the first and second compensation electrodes.

13. The method of claim 1, wherein applying the third and fourth RF voltages causes collision-induced dissociation of an ion in the interior space.

14. An electrode structure for manipulating ions, comprising:

a plurality of main electrodes coaxially disposed about a central axis and extending generally in the direction of the central axis, the main electrodes defining an interior space extending along the central axis;

a compensation electrode disposed in the interior space proximate to a corresponding main electrode at a radial distance from the central axis less than the radial distance of the corresponding main electrode from the central axis;

means for applying a first RF voltage to at least two of the main electrodes;

means for applying a second RF voltage to the compensation electrode; and means for forming a circularly polarized RF field in the interior space.

15. The electrode structure of claim 14, wherein:

the plurality of main electrodes includes a first main electrode, a second main electrode spaced from the first main electrodes along a first axis orthogonal to the central axis, a third main electrode, and a fourth main electrode spaced from the third main electrode along a second axis orthogonal to the central axis; and the means for forming the circularly polarized RF field includes means for applying a third RF voltage between the first and second main electrodes, and means for applying a fourth RF voltage between third and fourth main electrodes in phase quadrature with the third RF voltage.

16. The electrode structure of claim 14, wherein the means for applying the second RF voltage includes means for adjusting a multipole formed in the interior space.

17. The electrode structure of claim 14, wherein the means for applying the second RF voltage includes means for adjusting the second RF voltage between a first amplitude optimal for a first mode of operation and a second amplitude optimal for a second mode of operation.

18. The electrode structure of claim 14, comprising a plurality of compensation electrodes, wherein the means for applying the second RF voltage includes means for applying the adjustable second RF voltage to at least two of the compensation electrodes.

19. The electrode structure of claim 14, wherein:

the at least two main electrodes are first and second main electrodes, and the plurality of main electrodes further includes a third main electrode and a fourth main electrode;

the electrode structure comprises a first compensation electrode, a second compensation electrode, a third compensation electrode and a fourth compensation electrode;

the means for applying the first RF voltage further includes means for applying the first RF voltage to the third and fourth main electrodes at a polarity opposite to the polarity applied to the first and second main electrodes; and the means for applying the second RF voltage includes means for applying the second RF voltage to the first and second compensation electrodes, and to the third and fourth compensation electrodes at a polarity opposite to the polarity applied to the first and second compensation electrodes.

20. The electrode structure of claim 14, wherein at least one of the main electrodes has an aperture, and the compensation electrode is disposed proximate to the aperture.

* * * * *